US006578014B1

(12) United States Patent
Murcko, Jr.

(10) Patent No.: US 6,578,014 B1
(45) Date of Patent: Jun. 10, 2003

(54) METHOD AND APPARATUS FOR POST-TRANSACTION PRICING SYSTEM

(76) Inventor: Thomas Murcko, Jr., 643 N. Abingdon St., Arlington, VA (US) 22203

( * ) Notice: Subject to any disclaimer, the term of this patent is extended or adjusted under 35 U.S.C. 154(b) by 0 days.

(21) Appl. No.: 09/548,151
(22) Filed: Apr. 13, 2000

Related U.S. Application Data
(60) Provisional application No. 60/129,157, filed on Apr. 14, 1999.

(51) Int. Cl.$^7$ .............................................. G06F 17/60
(52) U.S. Cl. ........................................................ 705/26
(58) Field of Search .................................... 705/26, 27

(56) References Cited

U.S. PATENT DOCUMENTS

| | | | |
|---|---|---|---|
| 4,412,287 A | | 10/1983 | Braddock, III |
| 4,789,928 A | | 12/1988 | Fujisaki |
| 4,903,201 A | | 2/1990 | Wagner |
| 5,077,665 A | | 12/1991 | Silverman et al. |
| 5,168,446 A | | 12/1992 | Wiseman |
| H1708 H | * | 2/1998 | Davidson et al. ........ 235/381 X |
| 5,758,328 A | | 5/1998 | Giovannoli |
| 5,794,207 A | | 8/1998 | Walker et al. |
| 5,835,896 A | | 11/1998 | Fisher et al. |
| 5,845,265 A | * | 12/1998 | Woolston ..................... 705/37 |
| 5,890,138 A | | 3/1999 | Godin et al. |
| 5,895,454 A | | 4/1999 | Harrington |
| 5,905,975 A | | 5/1999 | Ausubel |

(List continued on next page.)

FOREIGN PATENT DOCUMENTS

JP          6-291889      * 10/1994

OTHER PUBLICATIONS

Seymour, J., The Corporate Micro: Communications Program Market Face Tough Freeware Competition PC Week, vol. 1, No. 42, p. 34, Oct. 23, 1984.*

Comerford, Cathy, Pay What you Like is a Recipe for Success, Independent, May 25, 1998.*

Primary Examiner—F. J. Bartuska

(57) ABSTRACT

The present invention is a method and apparatus for effectuating post-transaction-priced transactions of information, goods, and services in exchange for money or its equivalent (such as credits). The invention allows prospective sellers of information, goods and services to offer those items globally to potential buyers, for buyers to make item requests of sellers, for sellers and buyers conveniently to search for relevant buyer and seller information, for sellers to provide items to buyers without any guarantee of a specific payment amount, and for buyers to decide how much to pay for those items after having received them. The method and apparatus of the present invention have applications on the internet as well as conventional communications systems such as voice telephony. In a preferred embodiment, the method and apparatus of the present invention include mechanisms through which information about participants and previous transactions is revealed in such a way as to encourage buyers to pay a fair amount for the items provided, and to encourage sellers to provide items that are of high value to the buyers to whom they provide those items. Specifically, the system stores information regarding previous transactions and makes this information available to participants, so that they are able to intelligently decide which participants are worth transacting with. For example, a buyer who routinely pays nothing for items will soon have difficulty finding sellers interested in selling him/her items, while a buyer who consistently pays a fair price for items will be able to expect a steady stream of items. Similarly, a seller who consistently provides items which buyers are willing to pay large amounts for will have greater ability to provide items to buyers in the future, while a seller who provides items which buyers generally find worthless will have great difficulty finding any buyers to provide items to.

9 Claims, 25 Drawing Sheets

U.S. PATENT DOCUMENTS

| | | | |
|---|---|---|---|
| 5,907,617 A | * 5/1999 | Ronning | 380/4 |
| 5,924,082 A | 7/1999 | Silverman et al. | |
| 5,950,172 A | * 9/1999 | Klingman | 705/26 |
| 6,012,045 A | 1/2000 | Barzilai et al. | |
| 6,023,685 A | 2/2000 | Brett et al. | |
| 6,035,288 A | 3/2000 | Solomon | |
| 6,216,112 B1 | * 4/2001 | Fuller et al. | 705/14 |
| 6,260,024 B1 | * 7/2001 | Shkedy | 705/37 |
| 6,272,636 B1 | * 8/2001 | Neville et al. | 713/189 |

* cited by examiner

BUYER ITEM REQUESTS
DATABASE           800

SYSTEM PAYMENTS TO
SELLERS DATABASE   900

BUYER REGISTRATION FORM 1400     FIG. 14

BUYER LOGIN

USER NAME: _____
PASSWORD: _____    1502

IF LOGIN IS SUCCESSFUL:

| BUYER SEARCHES FOR SELLERS 1504 | BUYER ACCOUNT INFORMATION 1510 |
| BUYER ITEM REQUEST 1506 | BUYER SPECIFIES ACCEPTABLE SELLERS 1512 |
| BUYER VIEWS ITEMS 1508 | TOP LISTINGS 1514 |

UPDATE REGISTRATION INFORMATION    1516

BUYER LOGIN FORM 1500

FIG. 15

BUYER SEARCHES FOR SELLERS

- SEARCH ALL SELLERS    1602

- SEARCH ALL ITEMS SELLERS HAVE AVAILABLE
  - INFORMATION
  - GOODS
  - SERVICES
  - ALL TYPES    1604

SEARCH BY AREA OF EXPERTISE:    [LIST]    1606

SEARCH BY OCCUPATION:    [LIST]    1608

SEARCH TEXT:    1610

SEARCH/SCREEN BY AVERAGE PAYMENT: _____    1612

SEARCH/SCREEN BY NUMBER OF COMPLETED TRANSACTIONS: ___    1614

SEARCH BY PARTICIPANT COMMENTS: _____    1615

RESULTS:
    1616

BUYER SEARCHES FOR SELLERS FORM 1600

FIG. 16

BUYER ITEM REQUEST

ITEM DESIRED: _____ 1702

ITEM TYPE DESIRED: _____ 1704

FROM:

SPECIFIC SELLER(S): _____ 1706

TYPES OF SELLER(S): _____ 1708

OTHER REQUIRED SELLER CRITERIA: __ 1710

TEMPLATES   1712

PRICING GUIDANCE (optional): _____ 1714

CUTOFF PERCENTILE: 1720

BUYER ITEM REQUEST FORM 1700

BUYER VIEWS ITEMS

Previous Item ⇐    Next Item ⇒

ITEM: (link if applicable) _____ 1802

ITEM DESCRIPTION: _____ 1804

SELLER: _____ 1806

DATE/TIME: _____ 1808

PAYMENT AMOUNT: _____ 1810

PAYMENT DATE: (set automatically) _____ 1812

BUYER'S REQUEST FOR ADDITIONAL INFORMATION OR COMMENTS (where applicable): _____ 1814

SELLER'S REPLY TO BUYER'S REQUEST (where applicable): _____ 1816

☐ CLOSE ITEM REQUEST 1818

BUYER VIEWS ITEMS PAGE 1800

FIG. 18

BUYER ACCOUNT INFORMATION

NAME:

DATE:

BALANCE: $

| Date | Payment |
|------|---------|
|      |         |
|      |         |
|      |         |
|      |         |
|      |         |

METRICS: AVERAGE PAYMENT: _____
NUMBER OF ITEMS BOUGHT: _____
AVERAGE TIME TO PAY: _____
% OF PAYMENTS MADE ON TIME: _____

MAKE PAYMENT  1910

BUYER ACCOUNT
INFORMATION PAGE 1900

SELLER REGISTRATION

COMPANY NAME:_____
SITE NAME:_____
URL:_____
DATE/TIME: (set automatically)

PHONE:_____
EMAIL:_____
POSTAL ADDRESS:_____
OCCUPATION:_____
EDUCATION LEVEL:_____
AREAS OF EXPERTISE:_____

NAME:_____ 2010

PASSWORD:_____ 2012

PREFERRED PAYMENT METHOD:_____ 2013

ADDITIONAL PAYMENT INFORMATION:___ 2015

PROVIDE ITEMS  2023

SELLER REGISTRATION
FORM 2000

FIG. 20

SELLER LOGIN

USER NAME: _____
PASSWORD: _____ 2102

IF LOGIN IS SUCCESSFUL:

| SELLER SEARCHES FOR BUYERS 2104 | SELLER ACCOUNT INFORMATION 2110 |
|---|---|
| SELLER PROVIDES ITEM 2106 | TOP LISTINGS 2112 |
| SELLER VIEWS ITEMS 2108 | |

UPDATE REGISTRATION INFORMATION 2114

SELLER LOGIN FORM 2100

FIG. 21

SELLER SEARCHES FOR BUYERS

- SEARCH ALL BUYERS  2202

SEARCH BY CATEGORY OF BUYER: [LIST] 2206

- SEARCH BY BUYER ITEM REQUESTS
  - INFORMATION
  - GOODS
  - SERVICES
  - ALL TYPES  2204

SEARCH TEXT: _____ 2208

SEARCH/SCREEN BY AVERAGE PAYMENT: _____ 2210

SEARCH/SCREEN BY NUMBER OF COMPLETED TRANSACTIONS: ____ 2212

SEARCH BY ON-TIME PAYMENTS: _____ 2214

SEARCH BY PARTICIPANT COMMENTS: _____ 2215

RESULTS:

2216

SELLER SEARCHES FOR BUYERS FORM 2200

FIG. 22

SELLER PROVIDES ITEM

ITEM: _____
or
DESCRIPTION: _____   2302

POTENTIAL BUYER(S):
TYPES: [____]
NAMES: [____]   2304

SUGGESTED AMOUNT: _____ 2306

SELLER PROVIDES
ITEM FORM 2300

FIG. 23

SELLER VIEWS ITEMS

Previous Item ⬅    Next Item ➡

ITEM: (link if applicable) _____ 2402

ITEM DESCRIPTION: _____ 2404

BUYER: _____ 2406

DATE/TIME: _____ 2408

PAYMENT AMOUNT: _____ 2410

PAYMENT DATE: (if paid) _____ 2412

BUYER'S REQUEST FOR ADDITIONAL INFORMATION OR COMMENTS (where applicable): _____ 2414

SELLER'S REPLY TO BUYER'S REQUEST (where applicable): _____ 2416

SELLER VIEWS
ITEMS PAGE 2400

FIG. 24

SELLER ACCOUNT INFORMATION

| Date | Payment |
|------|---------|
|      |         |
|      |         |
|      |         |
|      |         |
|      |         |
|      |         |

NAME: ☐

DATE: ☐

METRICS:
    AVERAGE PAYMENT: _____
    NUMBER OF ITEMS BOUGHT: _____
    AVERAGE PAYMENT FOR EACH BUYER:

|  |  |
|--|--|
|  |  |

OUTSTANDING PAYMENTS:

|  |  |  |  |
|--|--|--|--|
|  |  |  |  |

SELLER ACCOUNT
INFORMATION PAGE 2500

FIG. 25

MORE INFORMATION PAGE 2600

TERMS OF USE PAGE 2700

PARTICIPANT DIRECTORY

BUYERS

| NAME | DATE JOINED | #/ITEMS | ... |
|------|-------------|---------|-----|
|      |             |         |     |

SELLERS

| NAME | DATE JOINED | AREAS OF EXPERTISE | #/ITEMS | ... |
|------|-------------|--------------------|---------|-----|
|      |             |                    |         |     |

PARTICIPANT DIRECTORY 2900

FIG. 29

|  | PAYMENT AMOUNT HAS NOT BEEN SET | PAYMENT AMOUNT HAS BEEN SET, PAYMENT HAS NOT YET BEEN MADE | PAYMENT AMOUNT HAS BEEN SET, PAYMENT HAS BEEN MADE |
|---|---|---|---|
| ITEM DATE + D1 >= CURRENT DATE 3002 | DOES NOT COUNT TOWARD PAYMENT AMOUNT. 3010 | COUNTS TOWARD AVERAGE PAYMENT. 3018 | COUNTS TOWARD AVERAGE PAYMENT. 3026 |
| ITEM DATE + D1 < CURRENT DATE >= PAYMENT DATE + D2 3004 | LATE. COUNT AS PAYMENT = 0. ALLOW BUYER TO CHANGE IT. 3012 | COUNTS TOWARD AVERAGE PAYMENT. 3020 | COUNTS TOWARD AVERAGE PAYMENT. 3028 |
| PAYMENT DATE + D2 < CURRENT DATE 3006 | LATE. COUNT AS PAYMENT = 0. ALLOW BUYER TO CHANGE IT. 3014 | LATE. COUNT AS PAYMENT = 0. ALLOW BUYER TO CHANGE IT. 3022 | COUNTS TOWARD AVERAGE PAYMENT. 3030 |

D1 = DAYS A BUYER HAS AFTER RECEIVING AN ITEM IN WHICH TO ASSIGN A PAYMENT AMOUNT.
D2 = DAYS A BUYER HAS AFTER ASSIGNING A PAYMENT AMOUNT FOR AN ITEM IN WHICH TO MAKE A PAYMENT FOR THAT ITEM.

AVERAGE PAYMENT CALCULATION 3000

FIG. 30

BUYER SPECIFIES ACCEPTABLE SELLERS

○ ALL  3202

○ AREAS OF EXPERTISE

3204

○ OCCUPATIONS

3206

○ AVERAGE PAYMENT
$ _____ TO _____
%ile _____ TO _____
3208

○ NUMBER OF COMPLETED TRANSACTIONS
> _____  < _____
3210

BUYER SPECIFIES ACCEPTABLE
SELLERS FORM 3200

FIG. 32

METHOD AND APPARATUS FOR POST-TRANSACTION PRICING SYSTEM

CROSS-REFERENCE TO RELATED APPLICATIONS

This is a continuation of provisional application Ser. No. 60/129,157 filed Apr. 14, 1999.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The method and apparatus of the present invention relate to a commercial network system to facilitate transactions.

Buyers and sellers traditionally exchange information, goods, and services for money through one of several methods. In the most common of these, the seller sets the price, and the buyer either accepts that price or doesn't (for example, retail, or most classified ads). In another common method, the buyer and seller agree to a price (for example, a flea market, or a classified ad which includes 'or best offer'). Sometimes buyers compete and the highest price offered wins (for example, a standard auction, a reverse auction, or a Dutch auction). Sometimes sellers compete for a given buyer (for example, a 'wanted to buy' classified ad). Other commerce systems are exchange-driven, and buyers and sellers are matched in an orderly marketplace (such as the NASDAQ or the New York Stock Exchange). In all of these buyer-seller protocols, the buyer and seller agree to the price and other payment terms before the information, goods, and services are provided. Several U.S. patents relate to on-line electronic communications and processing of transactions between multiple buyers and sellers with these various buyer-seller protocols. But for every single one of these, the buyer and seller do agree to a price before the transaction is completed; indeed, if an agreement on price and other terms cannot be reached, the transaction does not occur.

While each of these systems does enable and make efficient some types of transactions, other transactions are not able to be carried out or are not done optimally for a variety of reasons. For example, a buyer may be uncertain about the value of the item(s) he/she is considering buying and might therefore be reluctant to make the purchase. Unless the item is a commodity product (i.e. identical to or interchangeable with another item of the same type), the value of the item will not be immediately apparent and will take time, effort and cost for the buyer to determine, based on the item's unique features. An item could be intentionally or unintentionally described incorrectly or incompletely by the seller, misleading the buyer about its value.

In some cases, the value of an item to a given buyer simply cannot be known until the item is received and used. Economists call such items "experience goods". One example is a research article which may or may not contain some specific information that a buyer is looking for: if the information is in the article then the article is valuable to the buyer, but if not then it is worthless to him/her.

Additionally, each of these systems requires that the buyer and seller agree to not just the price but all the other terms of the transaction as well, before the transaction can occur. There are often high costs associated with this activity, such as lengthy contracts with various conditions and stipulations. Even for those transactions which do get carried out, there are issues with the systems that are currently used. For example, even after an item is delivered, there may be disputes about whether the item that was delivered is really the item that was described by the seller: for example, some features of the item detracting from its value may not have been mentioned by the seller. Additionally, a buyer may not know anything about a seller and may be unsure about whether that seller can be trusted. Some attempts have been made to minimize the negative effects of these problems, such as warranties and money-back guarantees or consulting "on spec", but each of these has its own set of limitations that restrict its use and can introduce inefficiencies and costs into the transaction process. Similarly, a seller may not know anything about a buyer and may be unsure about whether the buyer is serious about purchasing the item, and whether the buyer has enough money to pay for the item.

Another issue is that some people don't like to negotiate, and may choose not to engage in a transaction which requires negotiation, or one which is likely to result in a suboptimal deal without negotiation.

Another issue is enforcement. If either participant feels that the other has committed a fraudulent act, he/she does have some recourse through legal channels; but this activity can be time-consuming and expensive.

Additionally, customer service is sometimes low-quality, because a seller may not have sufficient financial incentive to provide high-quality customer service once he/she has received payment for the information, goods, and services provided.

Furthermore, existing pricing methods are not well-suited to items which can be sold to multiple buyers, such as information. For example, auctions operate based on competition between buyers for a given item, but if the item can be provided to a potentially unlimited number of buyers, the supply is not constrained and buyers have no reason to try to outbid one another.

Also, buyer-driven systems are not prevalent in general, because buyers usually do not want to be inundated with numerous offers from potential sellers, many of whom may be marginal or unqualified (e.g. a thousand real estate brokers or car dealers all calling one buyer).

Furthermore, buyer-driven systems impose inherent costs on sellers as well. If each buyer has a different set of purchasing specifications and communicates his needs using non-uniform language, sellers must pay a substantial cost to review and understand each individual request. Moreover, sellers are often not amenable to customizing their products for individual buyers.

The applicant is unaware of the existence of any commercially-viable commerce system which addresses the above-described shortcomings in the prior art by allowing the buyer to set the price following receipt of the item. Therefore, it is one object of the present invention to set forth a system of electronic commerce that offers the capability for buyers and sellers to transact and for buyers to set the price for a given item after receiving the item.

Basic Contract Law

In order to understand the requirements necessary to form binding contracts through electronic commerce, a brief review of the current state of contract law is necessary. An essential prerequisite to the formation of a contract is an agreement: a mutual manifestation of assent to the same terms. This is the case for the present invention: the buyer and seller both understand that the seller is providing the item to the buyer without any guarantee of a specific payment, and state such understanding by accepting the user agreement when registering to use the system.

With the advent of new technology, methods of doing business are rapidly expanding. These new methods challenge traditional contract principles, which are premised on personal contact and paper contracts. Thus, some legal issues in the field of electronic commerce remain unresolved. Despite the uncertainty, when a transaction occurs in a purely electronic environment, the threshold legal determination revolves around whether the electronic messages establish an offer and acceptance given the absence of documentation.

The exchange of electronic messages that offer and accept a contractual relationship should form a contract with respect to the specific order. An offer consists of an expression of a willingness to enter a contract when that expression occurs in a form sufficiently concrete to establish that agreement. Under this doctrine, an electronic message may constitute the necessary expression of intent. Problems exist where unauthorized people or inaccurate information trigger an offer from a system. These problems could be solved by methods of attribution or authentication. Once questions of attribution are resolved, and subject to considerations about the Statute of Frauds and the like, no requirement exists in law that a contract offer be in writing.

Of course, the writing requirement can be satisfied by other means. For example, if the electronic agreement is followed up by a letter or if the system routinely yields printed output, the requirement should be satisfied. But apart from a printed output at the receiving point or in a functional acknowledgment returned after receipt, the enforceability of a purely electronic contract depends on how the computer system retains records of the transaction and whether a court will accept the idea that electronic records reduce the message to tangible form.

BRIEF SUMMARY OF THE INVENTION

In accordance with the present invention a method and apparatus for a commercial network system designed to facilitate transactions for which a buyer determines the price he/she pays after receiving the information, goods, and/or services from a seller.

The present invention is a method and apparatus for effectuating post-transaction-priced transactions of goods, services, and information in exchange for money or its equivalent (such as credits). The invention allows prospective sellers of information, goods and services to offer those items globally to potential buyers, for buyers to make item requests of sellers, for sellers and buyers conveniently to search for relevant buyer and seller information, for sellers to provide items to buyers without any guarantee of a specific payment amount, and for buyers to decide how much to pay for those items after having received them.

The method and apparatus of the present invention have applications on the internet as well as conventional communications systems such as voice telephony. Each participant can communicate with the system from remote terminals adapted to access communication links and the system may include remote terminals adapted for storage of a remote database. The system includes a database which contains participant and transaction information. The database is accessed via a validation procedure to permit transactions in an interactive online mode between users during interactive transaction sessions wherein one participant to the transaction is specifically selected by the other participant. The system permits concurrent interactive business transaction sessions between different participants.

In one embodiment of the present invention, communications between buyers and sellers are conducted using an electronic network and a system operator. A seller who wishes to sell an item accesses the system operator located at a remote server. The seller then specifies the item he/she wishes to sell, searches for buyers who might be interested in receiving such an item, and provides a description of the item (if the item is goods or services) or either a description of the item or the item itself (if the item is information) to those buyers. For example, a typical item could be a well-researched article about a specific subject, on which the seller is an expert. The seller searches and identifies one or more buyers who might be interested in the article, and then either provides the article or a description of it to the buyer(s). Under the present invention, the information may be transmitted via numerous means including a world wide web interface, email, voicemail, facsimile, or postal mail. Alternatively, the information may be developed while the seller is online with the system operator. The system operator then assigns a unique tracking ID to the item and the item is sent to each buyer that the seller specified. Subsequently, the buyer logs on to the system, views items that have been provided to him/her, and optionally specifies payment amounts for those items or requests additional information from the seller(s). After the buyer has sent the payment to the system operator to cover the item(s), the system operator sends a payment to the seller(s). Various methods of payment may be utilized by the invention, including credit cards, personal checks, electronic funds transfer, debit cards, digital cash, and escrow accounts.

The present invention can also be practiced in off-line embodiments. Instead of using email or web-based servers, buyers and sellers may communicate with the system operator via telephone, facsimile, postal mail, or another off-line communication tool. For example, sellers may use telephones to provide items (with or without the assistance of live agents) and buyers may use a telephone to buy those items.

In a preferred embodiment, the method and apparatus of the present invention include a mechanism through which information about participants and previous transactions is revealed in such a way as to encourage buyers to pay a fair amount for the items provided, and to encourage sellers to provide items that are of high value to the buyers to whom those items are provided. The system stores information regarding previous transactions and makes this information available to participants, so that they are able to intelligently decide which participants are worth transacting with. For example, a buyer who routinely pays nothing for items will soon have difficulty finding sellers interested in selling him/her any items, while a buyer who consistently pays a fair price for items will be able to expect a steady stream of items. Similarly, a seller who consistently provides items for which buyers are willing to pay large amounts will subsequently have greater ability to provide items to buyers, while a seller who provides items which buyers generally find worthless will have great difficulty finding any buyers to provide items to.

It is a goal of the present invention to provide a robust, global system which incorporates various methods of communication, commerce and security for the buyer and the seller, enabling sellers to provide information, goods, and services to buyers without the promise of any specific payment, and for those buyers to receive the information, goods, and services and subsequently decide how much (if anything) to pay the seller(s). The present invention enables some transactions to occur that might otherwise not, and enables some other transactions to be handled better than through traditional pricing methods.

OBJECTS AND ADVANTAGES

It is an object of the invention to overcome the aforementioned limitations of the prior art.

In traditional systems, if a buyer is uncertain about the value of the item he/she is buying, he/she might be reluctant to make the purchase. Similarly, if a buyer fears that an item is deliberately or unintentionally described incorrectly or incompletely by the seller, he/she might be reluctant to make the purchase. In the present invention, that reluctance is unnecessary because this risk has been eliminated, since the buyer is not obligated to pay a fixed amount for the item, but can instead pay whatever he/she feels is appropriate (including nothing at all).

In traditional systems, a buyer may not want to devote the time, effort and cost necessary to determine the item's value, based on its unique features. In the present invention, there is no time, effort and cost required for such a determination, because the value will be known later, upon actual use of the item.

In traditional systems, transactions of "experience goods" are often problematic because the value to the buyer can only be known by the buyer after receipt and use of the item. In the present invention, experience goods do not pose such a problem, because the buyer doesn't have to determine the price he/she is paying until after receipt of the item, at which point he/she will know its value.

In traditional systems, further problems arise from the fact that there are usually many characteristics of an item which affect its value, and these need to be known by and agreed upon by the buyer and the seller before an appropriate price can be established. In the present invention, this often laborious activity is no longer necessary, because the price is set by the buyer after he/she has the item and can easily determine its value.

In some traditional systems, negotiation is required in order to get the best possible deal, but a lot of people don't like to negotiate and/or are not good at it. The present invention eliminates the need for negotiation for both the buyer and the seller.

In traditional systems, there are often disputes after a transaction is completed, for example if the buyer feels that the item was not as described or some features of the item detracting from its value were not mentioned by the seller. In the present invention, neither party has any reason to fear that such a dispute will arise: the seller has agreed to sell with the understanding that he/she might not get anything for the item, and the buyer has the ability to set the price and therefore is not at risk of being shortchanged.

In traditional systems, enforcement is sometimes difficult. If either participant feels that the other has committed a fraudulent act, he/she does have recourse through legal channels, but this activity is time consuming and potentially expensive. The present invention makes enforcement unnecessary, because the seller has agreed to sell with the understanding that he/she might not get anything for the item, and the buyer has the ability to set the price and therefore is not at risk of being shortchanged.

In traditional systems, trust is a significant issue. The buyer and seller might not know anything about each other. If either party doesn't have a well-established reputation, the other party may be reluctant to engage in a transaction. The buyer may be wary of whether the seller can be trusted, and the seller may be uncertain about whether the buyer will be able to pay for the item. In the present invention, trust is not an issue, because the seller has agreed to sell with the understanding that he/she might not get anything for the item, and the buyer has the ability to set the price and therefore is not at risk of being shortchanged. (Note that reputation is still very important; in a preferred embodiment, participants can see how other participants have behaved in earlier transactions, and can decide who to transact with based on this information.)

In traditional systems, customer service is often low-quality, because the seller has insufficient financial incentive to provide high-quality customer service once the payment has been made. In the present invention, the seller does have a financial incentive to continue to work toward insuring the buyer's satisfaction, since the buyer's ultimate payment will likely be based on not just the item but the total package provided, including customer service.

Traditional systems are not well-suited to items which can be sold to multiple buyers, such as information, because there is no competition between buyers to outbid each other. In the present invention, the seller has control over how many potential buyers are able to buy the item, and can therefore limit supply to try to support a reasonable price. Also, for experience goods, items may be worth much more to one potential buyer than another. In the present invention, sellers who are able to determine which potential buyers might derive the most benefit from a given item are most likely to benefit financially.

In traditional systems, buyer-driven systems are not prevalent because buyers do not want to be inundated with numerous offers from potential sellers, many of whom may be marginal or unqualified (e.g. a thousand real estate brokers or car dealers all calling one buyer). In a preferred embodiment of the present invention, buyers have at least partial control over which sellers are able to provide them with items.

In some traditional systems, each buyer has a different set of purchasing specifications and communicates his needs using non-uniform language, and sellers often must pay a.substantial cost to review and understand each individual request. In the present invention, such detailed review of various items is unnecessary, as the buyer is not at risk if the item is not what is desired.

In traditional systems, the more complex the item is in terms of features, the more difficult it is to determine a fair price. Such complexity ceases to be a disadvantage with the present invention, because the buyer will be able to determine a fair price in the normal course of using the item.

For many types of transactions, the method described by this invention is an improvement over all of the traditional methods. It will enable some types of transactions to occur more efficiently than previously, and it will enable other types of transactions which probably would not have occurred at all without this invention. One reason that the buyer-sets-price-after-receiving-the-item method hasn't been successfully implemented is that no previous system provided the buyer with an incentive to pay anything. However, the present invention does. As described herein, in a preferred embodiment, the system stores and makes available to participants information about other participants' previous transactions, such as average payment overall, average payment by item type, and item descriptions. This information enables participants to see which other participants are worth transacting with: for example, sellers who provide items that other buyers have been willing to make large payments for, or buyers who tend to make large payments. Additionally, in a preferred embodiment, buyers can specify that they will accept items only from sellers who have received at least a certain minimum average payment in previous transactions (herein called a "cutoff percentile"). As a result, buyers who have higher average payments will subsequently tend to get higher quality items; this provides them with an incentive to pay for the items they do receive. Sellers (especially high-quality sellers) will tend to provide items only to buyers who have demonstrated a willingness to pay a fair amount for what they receive. Sellers will not want to waste their time and energy providing items to buyers who have acted in such a way as to lead these sellers to believe they will not receive a fair amount for the items they provide. Similarly, sellers will have a motivation to provide high-quality items, and to provide them to the buyers who will derive the most value from them. Sellers who provide items haphazardly will tend to be penalized in the form of lower average payments, meaning that they would subsequently be able to provide items to a smaller subset of the buyers (specifically, those buyers with cutoff percentiles low enough to include the seller). It is the iterated nature of the transactions coupled with the availability of information about those transactions that makes the quality of items and the fairness of payments in the system self-regulating. The ability of buyers to see information on sellers and (in a preferred embodiment) to screen out unacceptable sellers makes the quality and quantity of transactions in the system self-regulating. Note that unlike through most traditional systems in which the benefits of iterated transactions (trust, reputation, etc.) accrue only as the same buyer and seller repeatedly interact with one another, this system provides such benefits to all participants, so that even before a buyer and seller have ever directly interacted with one another, each will have a good idea of whether the other participant is someone with whom he/she wants to engage in transactions.

The inventor's expectation is that free market forces will enable this invention to lead to a new and efficient pricing system and will enable some transactions to occur more efficiently and other transactions to occur which otherwise might not occur at all. The inventor believes that while the present invention works for all types of items including information, goods, and services, it will probably prove to be most valuable for information, relatively valuable for services, and only slightly valuable for goods. The reason for this is as follows. Most physical goods have a fairly well-established value (or at least a range of values, depending on the specific features), so a seller might be reluctant to sell goods without a promise of any payment. However, a given piece of information is often much more valuable to one party than to another, so the seller would be inclined to provide it to the buyer, who values it much more highly than the seller does. Additionally, since some information can have multiple owners (i.e. a seller who sells information still has that information, which isn't the case with physical goods), most sellers will be less reluctant to provide such information to a buyer without promise of payment than they would to provide physical goods.

Another advantage of the present invention is that (in a preferred embodiment) each buyer can govern the quantity of items received by an appropriate specification of the cutoff percentile. Buyers who only want a small quantity of items can set their cutoff percentile to a low number (e.g. 25%, meaning that only the top 25% of all sellers are able to provide items to this buyer), while buyers who want a high quantity of items can set it to a high number (e.g. 75%). What's more, the invention tends to automatically maximize the quality of the items, given the specified quantity, by having the selection criteria be determined by average payment (or average payment per item type), a good measure of quality.

Additionally, this system automatically enables sellers with high average payments to provide items to more buyers than those with low average payments (again due to the cutoff percentile), providing sellers with an additional incentive to provide high-quality items.

Another advantage of the present invention is that the system operator has the ability to alter the characteristics of the system to maximize the value of the system. For example, by making the requirements for joining as a buyer or a seller more or less restrictive, the ratio of buyers to sellers can be governed, a powerful tool in regulating the quality and quantity of items and the payments provided: A few examples will illustrate this point:

a. If the average cutoff percentile is low or falling, that probably means that the ratio of sellers to buyers is too high; the system operator could remedy this by being more restrictive when allowing new sellers to join or by more actively marketing to new buyers.

b. If the average payment is low or falling, that probably means that either quality is low or falling, or that the supply of items is high or rising; the system operator could remedy this by being more restrictive when allowing new sellers to join or by more actively marketing to new buyers.

c. The system operator can encourage buyers to set high or low cutoff percentiles (in those embodiments which include this feature), for example by setting a certain default value, to affect the quantity and quality of transactions.

d. The system operator can modify the minimum payment amount (in that embodiment), to affect the quantity and quality of transactions.

e. The system operator can modify the time period that buyers have to assign a payment amount and the time period that buyers have to make the payment, to affect the average payment.

f. The system operator can modify the number of transactions required before a participant's data appears in the system, to affect the quantity and quality of transactions.

g. The system operator can modify the requirements for joining the system and the minimum performance level required to stay in, to affect the quality and quantity of transactions.

h. The system operator can shift how the value is divided between the two sides (buyers and sellers) in various ways to make sure that both sides get enough value to make participation worthwhile.

i. The system operator can modify the ratio of buyers and sellers in the system (such as by having different restrictions on joining or by differential marketing efforts), to affect the quantity and quality of items.

Another advantage of the present invention is that it can be utilized as a standalone system and it can also be integrated into other systems. For example, systems which currently employ other pricing mechanisms such as retail or auctions could offer the method of the present invention as a pricing option for their users. In some such embodiments, a plurality of such systems might be linked together to aggregate some data and to enable participants in different systems to engage in transactions with each other; in other such embodiments, they might not be linked together in this fashion.

The present invention is revolutionary in that it no longer requires that the buyer and seller reach an agreement about the value of an item before the transaction can occur. One advantage this system has over existing systems is that it enables the price to be related to the actual value provided, not just the apparent value. Also, it enables those with items of real value to provide them and receive a fair amount for them, creating a system in which those who have the highest-quality items collect the most revenues, rather than those who spend the most on advertising and branding, and creating a system in which the actual value that buyers derive from items is the most important determinant of price.

It is one object of the present invention to set forth a system of buyer-driven electronic commerce that enables sellers to provide information, goods, and services to buyers without any guarantee of a specific payment, and for those buyers to pay whatever amount they feel is appropriate after receiving the information, goods, and services.

It is a further object of the present invention to provide information about previous system transactions in such a way that participants are able to decide which other participants they would want to transact with.

A further object of the present invention is to ensure that buyers using the system are not inundated with items from unqualified sellers, and to ensure that sellers using the system are not inundated with item requests from unqualified buyers.

It is another object of the present invention to allow for items, such as information, which can be bought by multiple buyers.

Another object of the present invention is to show how all or part of the system can be practiced using electronic means such as the internet.

Another object of the present invention is to show how all or part of the system can be practiced using non-electronic means such as printed media or advertisements in newspapers.

Another object of the present invention is to enable give buyers and sellers performing transactions through traditional means another pricing option.

These and other objects and advantages of the invention will be apparent to those skilled in the art from the following detailed description of the invention, the accompanying drawings and the appended claims.

BRIEF DESCRIPTION OF THE SEVERAL VIEWS OF THE DRAWING

FIG. 14 illustrates one embodiment of the Buyer Registration form, which enables individuals and companies to register as buyers.

FIG. 15 illustrates one embodiment of the Buyer Login form, which enables registered buyers to log in to the system.

FIG. 16 illustrates one embodiment of the Buyer Searches For Sellers form, which enables buyers to search the database to find sellers who might have items, demographics and/or areas of expertise of interest to the buyers.

FIG. 17 illustrates one embodiment of the Buyer Item Request form, which enables buyers to make specific requests for items and/or areas of expertise.

FIG. 18 illustrates one embodiment of the Buyer Views Items page, which enables buyers to view, print, and/or save the information on the items they have received from sellers; and to assign payment amounts to those items.

FIG. 19 illustrates one embodiment of the Buyer Account Information page, which enables buyers to check their current balance so they know when payments need to be made.

FIG. 20 illustrates one embodiment of the Seller Registration form, which enables individuals and companies to register as sellers.

FIG. 21 illustrates one embodiment of the Seller Login form, which enables registered sellers to log in to the system.

FIG. 22 illustrates one embodiment of the Seller Searches For Buyers form, which enables sellers to search the database to find buyers who might want the items the sellers have or can obtain.

FIG. 23 illustrates one embodiment of the Seller Provides Items form, which enables sellers to provide items to buyers.

FIG. 24 illustrates one embodiment of the Seller Views Items page, which enables sellers to view, print, and/or save information about the items they have provided to buyers (including whether payment amounts have been assigned and paid to the system).

FIG. 25 illustrates one embodiment of the Seller Account Information page, which enables sellers to check their current balance and other account information.

FIG. 29 illustrates one embodiment of the Participant Directory, which displays an organized directory of participants.

FIG. 30 is a table explaining which transactions are included in a buyer's or a seller's average payment calculation, in one embodiment.

FIG. 32 illustrates one embodiment of the Buyer Specifies Acceptable Sellers form, which lets a buyer specify which sellers are able to provide items to him/her.

DETAILED DESCRIPTION OF THE INVENTION

Throughout this document, the term "item" is used to mean information, goods and/or services that are being provided by the buyer and to the seller in a single transaction. An item can be anything of potential value. Note that the first type of item, information, will sometimes be a pointer to the actual information (ex. a web site location or the name of a book or article), rather than the actual information itself. In a preferred embodiment, a single item can include information, goods, services, or any combination of the three. In other words, "item" for the purposes of the present invention can actually consist of multiple items within a single transaction.

Throughout this document, the term "information" is used to mean any non-physical item other than a service. For example, information could be text, software, graphics, audio, video, or in another format, or in a combination of different formats.

Throughout this document, the term "buyer" is used to mean a recipient of an item (for a given transaction), or an individual, a corporation, a partnership, a government, a software agent, or any other entity which has been, or has expressed interest in being, a recipient of items.

Throughout this document, the term "seller" is used to mean a provider of an item (for a given transaction), or an individual, a corporation, a partnership, a government, a software agent, or any other entity which has been, or has expressed interest in being, a provider of items.

Note that these definitions for buyer and seller are somewhat broader than their traditional meanings, since there will be some transactions between buyers and sellers for which no payment is made at all (in effect, the buyer bought the item for zero cost).

Throughout this document, the term "participant" is used to mean a buyer or a seller. In a preferred embodiment, a given participant may act as a buyer in some transactions and a seller in other transactions.

Throughout this document, the term "transaction" is used to mean a single instance of the process in which a seller makes a given item available to a specific buyer. A completed transaction is one in which the buyer receives the item.

Throughout this document, the term "system operator" is used to mean the entity which operates the system making use of the present invention, and optionally charges participants for use of the system.

System Architecture

The method and apparatus of the present invention will now be discussed with reference to FIGS. 1, 2, 3, and 4. In a preferred embodiment, the present invention includes system operator 200, buyer's interface.300, seller's interface 400 and associated databases.

Figure 1:
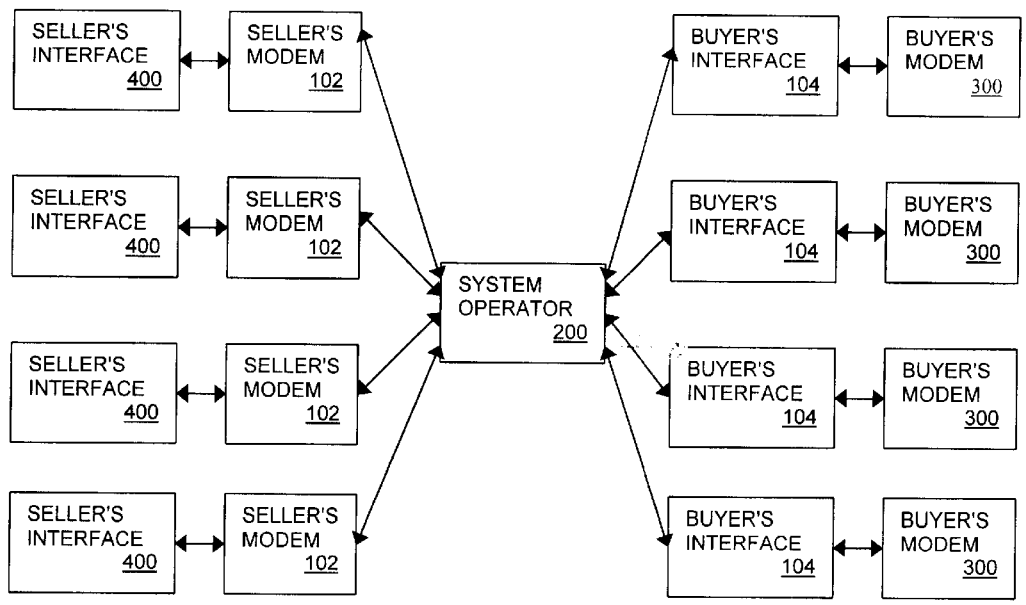
FIG. 1 illustrates one embodiment of the system operator and system participants.
Figure 28:
FIG. 28 illustrates one embodiment of the Top Listings page, which displays lists of top participants and top items based on various criteria.

The system architecture of a preferred embodiment of the apparatus and method of the present invention is illustrated with reference to FIGS. 1 through 4. As shown in FIG. 1, the apparatus of the present invention comprises system operator 200, buyer's interface 300, and seller's interface 400. System operator 200, buyer's interface 300, and seller's interface 400 are each connected via an Internet connection using a modem (102 for sellers, 104 for buyers). A variety of internet-enabled communications systems could be utilized to transfer data between the host system and the various remote users of the system, such as a public switched phone network, a cable network, data lines, cellular, Personal Communication Systems ("PCS"), microwave, or satellite networks. Buyer's interface 300 and seller's interface 400 are the input and output gateways for communications with system operator 200. The arrows indicate information being passed through the system: for example, information flows from seller's interface 400 to seller's modem 102 to system operator 200 when a seller registers (FIG. 20) or fills out the form providing an item to one or more buyers (FIG. 23), and information flows in the opposite direction when a seller runs a query to check his/her account balance (FIG. 25) or to look at the top listings (FIG. 28).

Although FIG. 1 illustrates just four buyers and four sellers, these numbers are only by way of example. In actual implementation, it is intended that the system according to the invention can support thousands of participants (or more) who can access the system as buyers and sellers.

In a preferred embodiment, a participant can be a buyer for some transactions and a seller for other transactions. In an optional feature of such an embodiment, participants can use the amounts they've earned as sellers as credit toward purchases when acting as buyers in other transactions; and if a participant has acted as a buyer in at least one transaction and as a seller in at least one transaction, those data could be reported separately through the system (ex. average payment as a buyer, average payment as a seller, two separate numbers), or those data could be aggregated and reported together.

In a preferred embodiment, some interactions between buyers, sellers, and the system operator are done online through a graphical user interface, such as on a web site, while some interactions are done via email. In a preferred embodiment, the buyer receives notification (perhaps via email each time or in digest format at a specified time frequency or once a certain number of unread notifications are waiting) when a seller submits information or replies to a buyer's request for more information; then the buyer logs in to the system (probably from the web site) to read the information, (optionally) to make a request for more information, or (optionally) to specify a payment amount for the transaction. The seller receives notification when a buyer makes a request for more information (perhaps via email each time or in digest format at a specified time frequency or number of waiting messages). In each of these instances, if the communication is via email, the email might contain some or all of the information, or it might just include a URL link to the information online, e.g. http://www.domainname.com/reports.cfm?num=123456, along with a password if that web page is password protected. In one embodiment, participants are sent email messages periodically by the system operator, to update them about the system's latest happenings, to encourage them to continue to use the system, and to deal with any outstanding transactions that require action.

In another embodiment, buyers and sellers communicate in an off-line manner with system operator 200. Rather than sending electronic mail or using web-based servers, buyers and sellers use a telephone, fax machine, postal mail, or other off-line communication tool. A buyer or seller may use a telephone, for example, to enter and receive information. The buyer calls system operator 200 and is connected with an agent or an automated interactive voice response unit. The buyer or seller provides his/her Name and Password so that system operator 200 can authenticate his/her identity, and then system operator 200 enables him/her to enter and receive information. In one embodiment, stronger authentication is sometimes used, such as social security number, federal tax ID number, and/or mailing address. Buyers and sellers may also communicate with an agent at system operator 200 through faxes or postal mail. The agent would receive the message and proceed to digitize the information and make it available through the system.

Figure 2:
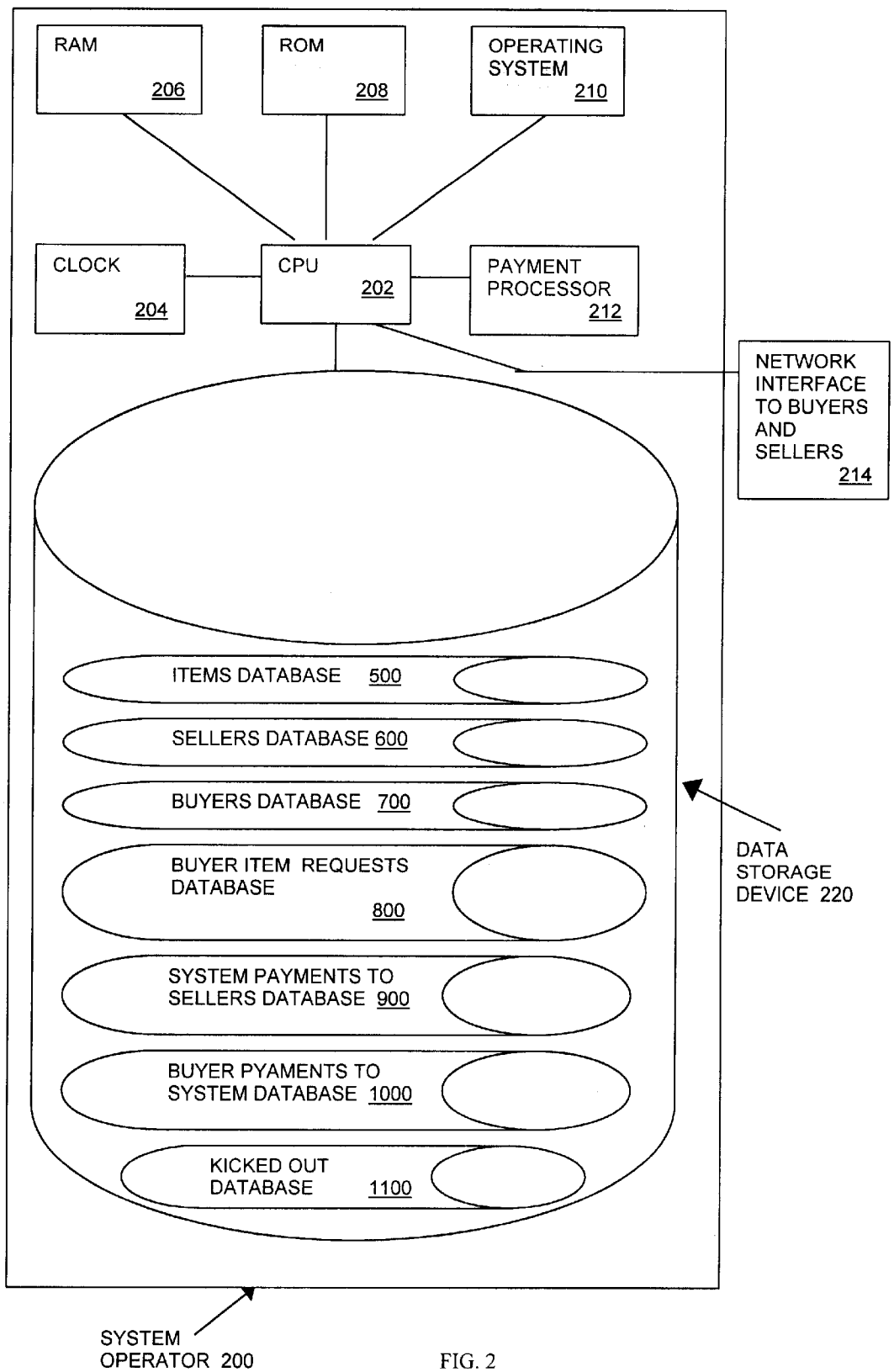
FIG. 2 illustrates one embodiment of the system operator.

As shown in FIG. 2, system operator 200 includes central processor (CPU) 202, RAM 206, ROM 208, payment processor 212, clock 204, operating system 210, network interface 214, and data storage device 220. As is conventionally known in the art, the ROM provides software instructions to perform basic operations upon power up of the system. Once the system receives these instructions, the CPU reads operating system instructions stored on disk to configure the system and to permit execution of various applications programs. Other applications conventionally known may be included in the software environment. A personal computer or computer workstation with sufficient memory and processing capability may be used as system operator 200. In one embodiment system operator 200 operates as a server, both receiving information from and transmitting information to buyers and sellers. System operator 200 must be capable of high volume transaction processing, performing a significant.number of mathematical calculations in processing communications and database searches. A microprocessor such as Intel's Pentium III, or a similar microprocessor from Advanced Micro Devices or another vendor, may be used for CPU 202.

Referring again to FIG. 2, payment processor 212 comprises one or more standard microprocessors (such as those from Intel), supporting the transfer and exchange of payments, charges, or debits, attendant to the method of the apparatus. Payment processor 212 may also be configured as part of CPU 202. Processing of credit card transactions by payment processor 212 may be supported with commercially available software, such as Open Market's Transact, which provides a complete set of end-to-end commerce services including online customer authentication and authorization, online order and payment processing, automated tax and shipping calculations, and online order tracking and status.

Data storage device 220 may include hard disk magnetic or optical storage units, as well as CD-ROM drives or flash memory. Data storage device 220 contains databases used in the processing of transactions and the storing and retrieval of information, including Items Database 500, Sellers Database 600, Buyers Database 700, Buyer Item Requests 800, System Payments to Sellers Database 900, Buyer Payments to System Database 1000, and Kicked Out Database 1100. The data illustrated in FIGS. 5–11 are representative of a preferred embodiment but might differ somewhat in any specific implementation. In a preferred embodiment a commercially available database management system with scalability and flexibility, such as Oracle's Oracle8 or Microsoft's SQL Server, is used to create and manage these databases. Security is implemented to prevent misuse by participants. Steps are taken to keep all information secure, especially payment data. In a preferred embodiment, these databases are all in the same Database Management System (DBMS), while in another embodiment they are distributed among multiple DBMSes. In some embodiments, some of the information which in a preferred embodiment is stored in the databases in data storage device 220 is instead stored on the buyers' and sellers' Data Storage Devices 320 (FIG. 3) and 420 (FIG. 4), respectively. This could be done for performance, security, or other reasons.

Network interface 214 is the gateway to communicate with buyers and sellers through buyer's interface 300 and seller's interface 400, respectively. Network interface 214 may utilize conventional internal or external modems or may utilize a T-1 or T-3 line if more bandwidth is required. In a preferred embodiment, network interface 214 is connected with the Internet and/or any of the commercial online services such as America Online, allowing buyers and sellers access from a wide range of online connections. Several commercial electronic mail servers include the above functionality and are platform independent and utilize open standards based on Internet protocols. Participants can exchange messages with enclosures such as files, graphics, video and audio. The system also supports multiple languages. Alternatively, network interface 214 may be configured as a voice mail interface, web site, or electronic mail address.

While the above embodiment describes a single computer acting as system operator 200, those skilled in the art will realize that the functionality can be distributed over a plurality of computers. In one embodiment, system operator 200 is configured in a distributed architecture, wherein the databases and processors are housed in separate units or locations. Some system operator components perform the primary processing functions and contain at a minimum RAM, ROM, and a general processor. Each of these components can be attached to a Wire Area Network (WAN) hub serving as the primary communication link with the other components and interface devices. The WAN hub may have minimal processing capability itself, serving primarily as a communications router. Those skilled in the art will appreciate that an almost unlimited number of system operators may be supported.

In one embodiment, system operator 200 has one or more pages on the World Wide Web, allowing buyers and sellers to provide and view information through the interface of conventional web browser software such as Netscape Navigator or Microsoft Internet Explorer. Instead of a world wide web-based interface, buyers and sellers may also send and receive information and items via electronic mail, voice mail, facsimile, or postal mail transmissions. With voice mail, the buyer or seller calls system operator 200 and leaves the information in audio form. This information may be transcribed into digital text at system operator 200, or made available to potential sellers in the same audio format. In a postal mail embodiment, system operator 200 acts more like a router, directing information to the buyers and sellers, creating multiple copies of the information if necessary. The information may also be posted to bulletin boards or web pages operated by system operator 200. System operator 200 supports a plurality of transmission methods, allowing for a wide variety of formats of information. Some formats may be changed, however, before further processing by system operator 200. Information transmitted by mail in paper form, for example, may be scanned-in and digitized, using optical character recognition software to create digital text.

In one embodiment, information sent from one participant to another through the system (items, item requests, questions and replies) may go through a series of processing steps. One step, if necessary, is language translation, either creating a standard language that all information must be written in, or translating to the language most appropriate for the buyers and sellers who will view it. This translation is provided by language experts at system operator 200, or by automatic translation software. Another step, if necessary, is to edit the information for spelling or grammatical errors and clarity. Any unclear information could be returned to the sender for clarification.

Figure 3:
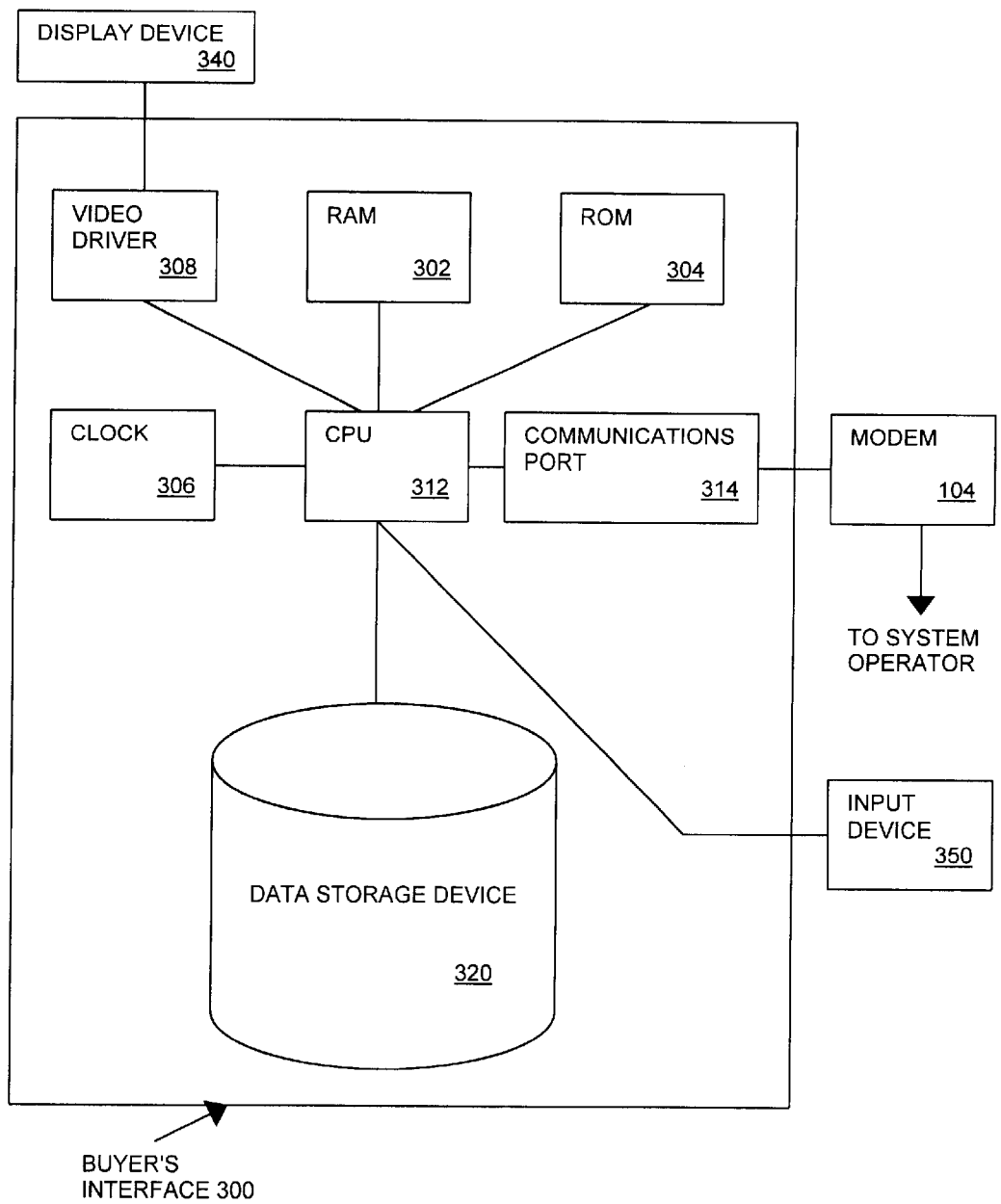
FIG. 3 illustrates one embodiment of the buyer's interface.
Figure 4:
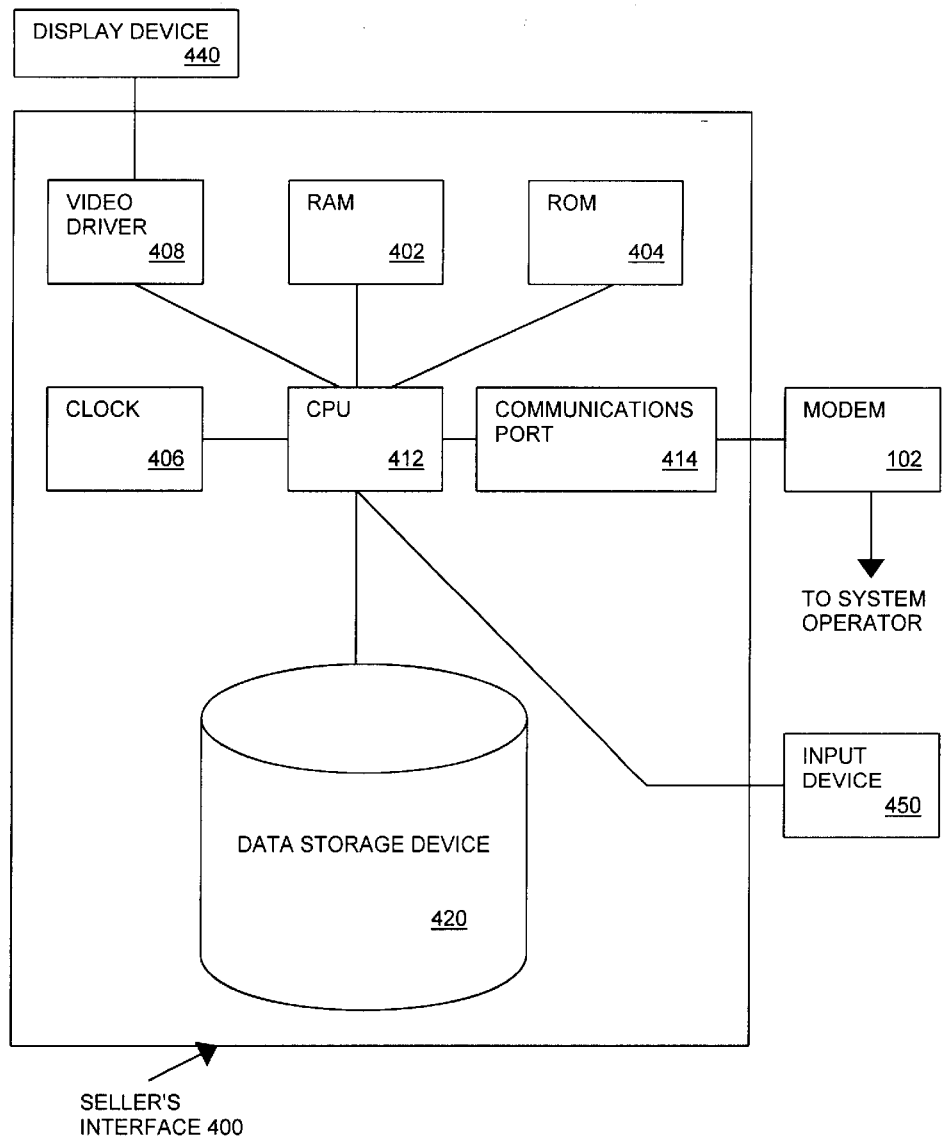
FIG. 4 illustrates one embodiment of the seller's interface.

FIGS. 3 and 4 describe buyer's interface 300 and seller's interface 400, respectively. In an exemplary embodiment they are both standard personal computers having one or more input devices, such as a keyboard, mouse, and/or voice recognition software; a display device, such as a video monitor; a processing device such as a CPU; and a network interface such as a modem. These devices interface with system operator 100 as in FIG 1. Alternatively, buyer's interface 300 and seller's interface 400 may also be voice-mail systems, fax machines, personal digital assistants (PDAs) with wireless connections, beepers, pagers or other electronic or voice communications systems.

Referring now to FIG. 3, there is described buyer's interface 300 which includes central processing unit (CPU) 312, RAM 302, ROM 304, clock 306, video driver 308, display device 340, communications port 314, input device 350, modem 104, and data storage device 320. An Intel microprocessor such the Pentium III may be used for CPU 312. Clock 306 is a standard chip-based clock which can serve to time-stamp any specific action a buyer takes, such as assigning a payment amount or asking a seller a question. Data storage device 320 is a conventional magnetic-based hard disk storage unit such as those manufactured by Seagate or Quantum. In some embodiments, some of the information which in a preferred embodiment is stored in the databases in data storage device 220 is instead stored on the buyers' Data Storage Device 320. This could be done for performance, security, or other reasons.

Referring now to FIG. 4, there is described seller's interface 400 which includes central processing unit (CPU) 412, RAM 402, ROM 404, clock 406, video driver 408, display device 440, communications port 414, input device 450, modem 102, and data storage device 420. An Intel microprocessor such the Pentium III may be used for CPU 412. Clock 406 is a standard chip-based clock which can serve to time-stamp any specific action a seller takes, such as providing an item to a buyer or responding to a buyer's question about an item. Data storage device 420 is a conventional magnetic-based hard disk storage unit such as those manufactured by Seagate or Quantum. In some embodiments, some of the information which in a preferred embodiment is stored in the databases in data storage device 220 (FIG. 2) is instead stored on the sellers' Data Storage Device 420. This could be done for performance, security, or other reasons.

There are many commercial software applications that can enable the communications required by buyer's interface 300 and seller's interface 400, the primary functionality being message creation and transmission. Qualcomm's Eudora Pro provides tools for the creation of messages as well as the routing of those messages to the appropriate electronic address. When system operator 200 is configured as a web server, conventional communications software such as Microsoft's Internet Explorer web browser may also be used. The buyer and seller may use the Internet Explorer browser to send information to and receive information from the system operator. No proprietary software is required. The system operator can use off-the-shelf software and hardware for its web server, and can create the forms, pages and screens in FIGS. 13–29 and 31–32 as web pages using off-the-shelf software, such as Microsoft Notepad, Netscape Composer, Microsoft FrontPage, Allaire ColdFusion, and other similar products. The web pages are hosted either in-house or by a site hosting service, with the appropriate software.

In another embodiment, telephony or another communication method is used instead of or in addition to a web site.

In a preferred embodiment, buyers and sellers are not able to interact directly and bypass the system. For example, buyers and sellers would not be given each other's contact information such as email addresses and phone numbers, and a seller would be given a buyer's postal mail address only in order to send goods to him/her. In another embodiment, a seller would not be given a buyer's postal mail address; instead, the item would be sent from the seller to the system operator and then from the system operator to the buyer. In another embodiment, buyers and sellers would sometimes be allowed some degree of direct interaction, such when the item provided is a service that requires direct interaction (for example, tax assistance).

In one embodiment, a buyer or a seller can put certain data (especially that data which relates to one's own transactions) in a format easy to copy to other applications (e.g. report writing, or saving as a spreadsheet file or database file).

Figure 5A:
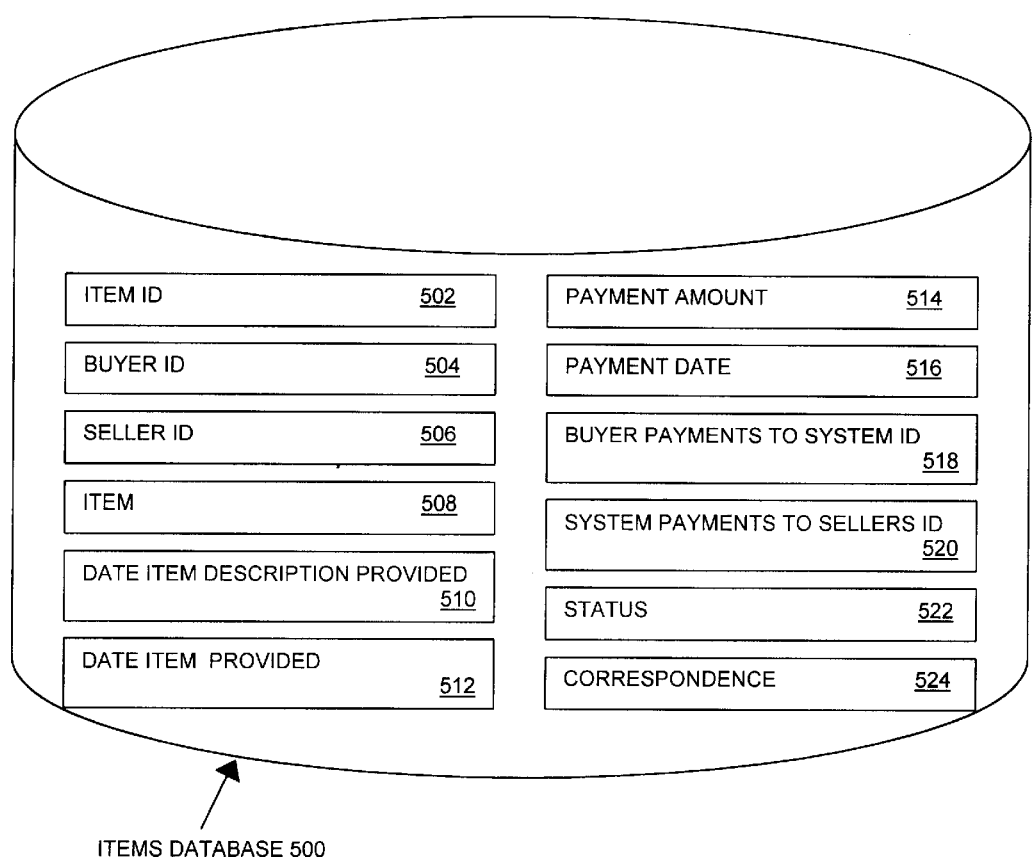
FIG. 5a illustrates one embodiment of the Items database.
Figure 10:
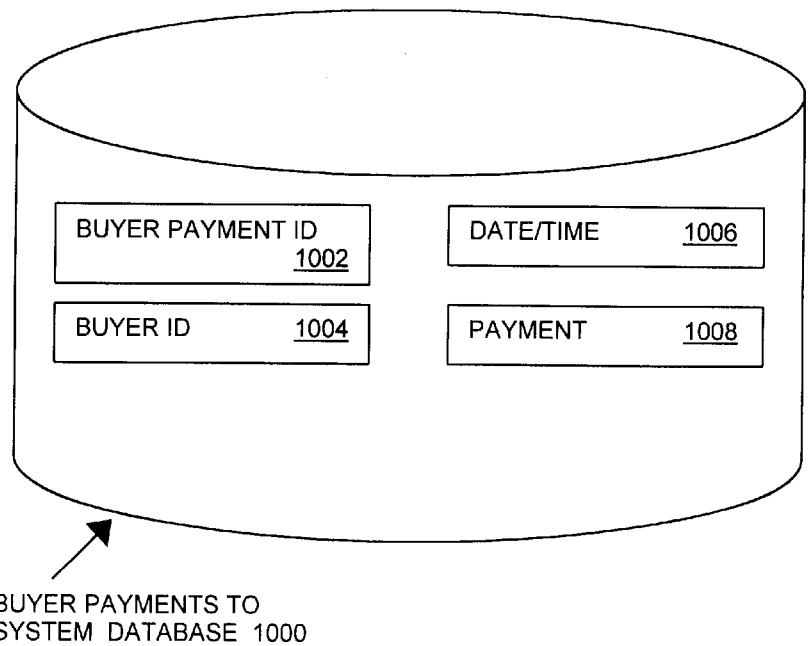
FIG. 10 illustrates one embodiment of the Buyer Payments to System database.

Referring to FIG. 5a, Items Database 500 maintains data on items that sellers are willing to sell, such as Item ID 502, Buyer ID 504, Seller ID 506. Item 508, Date Item Description Provided 510, Date Item Provided 512, Payment Amount 514, Payment Date 516, Buyer Payments To System ID 518, System Payments To Sellers ID 520, Status 522 and Correspondence 524. In a preferred embodiment, Items Database 500 has one record (row) for each item. Item ID 502 is a unique identifier for the item. Buyer ID 504 stores the numerical ID from Buyers Database 700 corresponding to the buyer for this transaction. Seller ID 506 stores the numerical ID from Sellers Database 600 corresponding to the seller for this transaction. Item 508 stores a description of the item, as it was entered by the seller through Seller Provides Item form 2300 (FIG. 23). If the item is information (as opposed to goods or services), this data may be the actual information the item consists of; or it may be a pointer to the item, such as a web page URL (e.g. http://www.sitename.com/pagename.html) or a book or magazine article (e.g. Business Week, Jan. 1, 1999, p. 100). Date Item Description Provided 510 stores the date on which the data in Item 508 was supplied by the seller. Date Item Provided 512 stores the date on which the item was provided by the seller. For items which are information, this date will usually be the same as Date Item Description Provided 510. For goods and services, this date might differ from Date Item Description Provided 510. Payment Amount 514 stores the amount that the buyer decides to pay for the item. Payment Date 516 stores the date on which the buyer assigns the payment amount for this item. Note that the date the payment is actually made from the buyer to the system operator to pay for this item doesn't need to be stored in this table, since it can always be found in the Buyer Payments To System database 1000 (FIG. 10).

Buyer Payments To System ID 518 stores the numerical ID from Buyer Payments To System database 1000 corresponding to the payment from the buyer to the system operator which includes the payment for this item. There will usually be a one-to-many correspondence between a buyer's payments to the system operator and a buyer's payment assignments for specific items; in other words, a buyer will make one large payment to the system operator in order to cover the payments for several items at once. System Payments To Sellers ID 520 stores the numerical ID from System Payments To Sellers database 900 corresponding to the payment from the system operator to the seller which pays for this amount. There will usually be a one-to-many correspondence between the system operator's payments to a seller and the seller's assigned payments from various buyers for various items; in.other words, a seller will receive one large payment from the system for a lot of items he/she provided. Status 522 stores the current status of this item (e.g. 'delivered but price not yet set'). Correspondence 524 stores communications back and forth, if any, between the buyer and seller regarding this item.

Figure 5B:
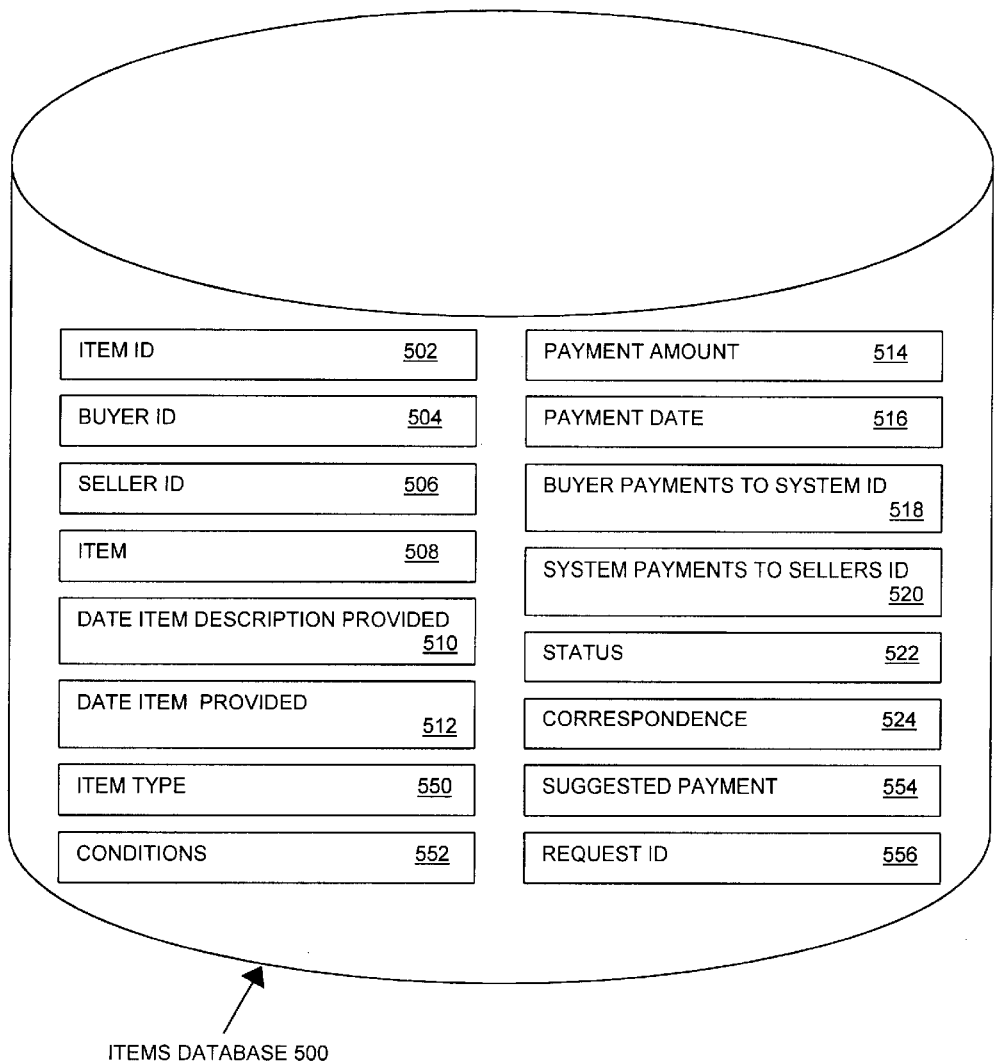
FIG. 5b illustrates another embodiment of the Items database in which additional item information is included.

Referring to FIG. 5b, in various embodiments, some information is stored in this database in addition to that shown in FIG. 5a. Here are some examples of additional data which exist in some embodiments and which could be stored in this database (note that for numbered drawing elements which appear in both FIG. Sa and FIG. 5b, the numbers refer to the same elements in both):

Item Type 550 stores information on what type of item the item is. Types can vary in various embodiments. For example, in one embodiment Item Type 550 stores either 'information', 'goods', or 'services'. In another embodiment, Item Type 550 could store more specific information, such as 'information:stock research:earnings prediction'. In a preferred embodiment, the system operator has the ability to change item types that he/she feels have been set incorrectly.

Conditions 552 stores information on any specific conditions on the sale of the item, imposed by the seller; for example, how delivery will occur.

Suggested Payment 554 stores a suggested payment amount that the seller can optionally provide for the buyer, which the buyer is free to consider or disregard.

Request ID 556 is Item Request ID 802 (FIG. 8) for those items which sellers offered in response to a buyer's item request; otherwise it is null.

Figure 6A:
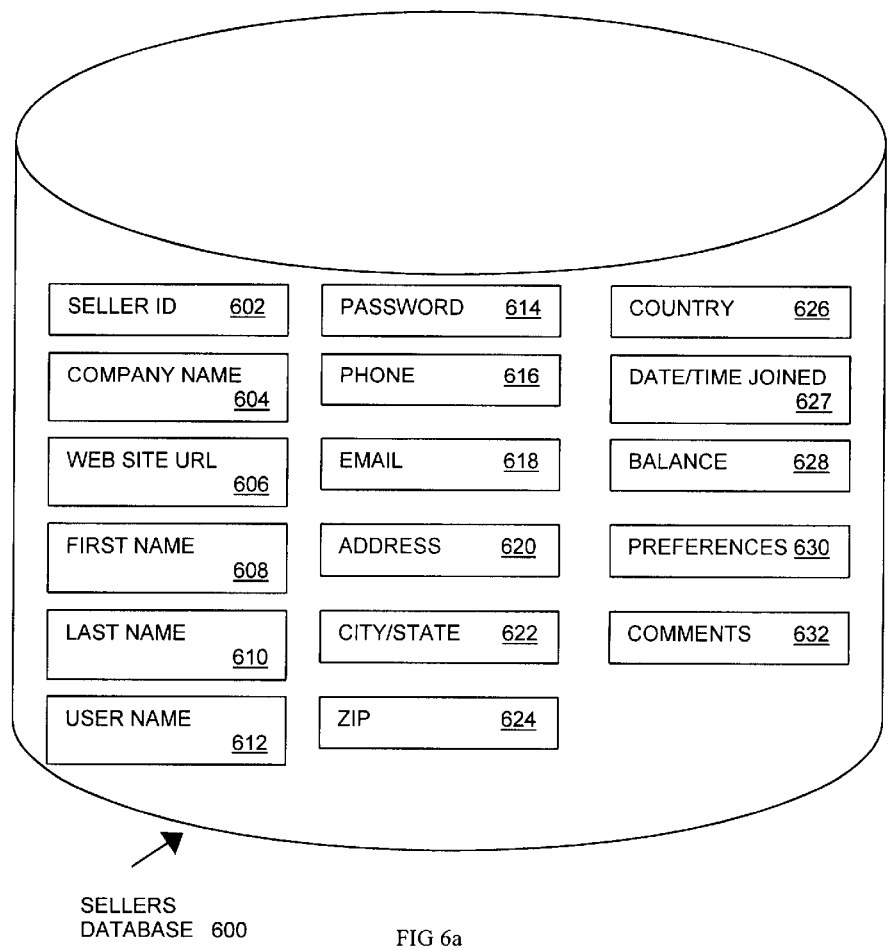
FIG. 6a illustrates one embodiment of the Sellers database.

Referring to FIG. 6a, Sellers database 600 maintains data on individuals, companies and other entities which are or want to be sellers, such as Seller ID 602, Company Name 604, Web Site URL 606, First Name 608, Last Name 610, User Name 612, Password 614, Phone 616, Email 618, Address 620, City/State 622, Zip 624, Country 626, Date/Time Joined 627, Balance 628, Preferences 630, and Comments 632. In a preferred embodiment, Sellers database 600 has one record (row) for each seller: Seller ID 602 is a unique identifier for the seller. Company Name 604 stores the name of the company if the seller is a company, otherwise it is blank. Web Site URL 606 is the URL for the home page of the company's web site if the company has a web site, otherwise it is blank. First Name 608 stores the first name of the seller, or the first name of the primary contact person if the seller is a company: Last Name 610 stores the last name of the seller, or the last name of the primary contact person if the seller is a company. User Name 612 stores the name by which the seller will be identified throughout the system. Password 614 stores the password which the seller will use to gain access to areas which are password-protected and areas which require authenticated identification. Phone 616 stores the phone number of the seller. Email 618 stores the email address of the seller. Address 620 stores the postal address of the seller (e.g. 123 Main Street). City/State 622 stores the city and state of the seller. Zip 624 stores the zip code of the seller. Country 626 stores the country of the seller. Date/Time Joined 627 stores the date and time when the seller joined the system. Balance 628 stores the current balance of the seller, which is owed to him/her by the system operator. Preferences 630 stores the seller's preferences about the various settings within the system which the seller has full or partial control over, such as the format in which various information is displayed. Comments 632 stores any comments that the system operator enters about the seller.

In various embodiments, some of this information is stored on seller's interface 400, such as through a text file, database file or a "cookies" file.

Figure 6B:
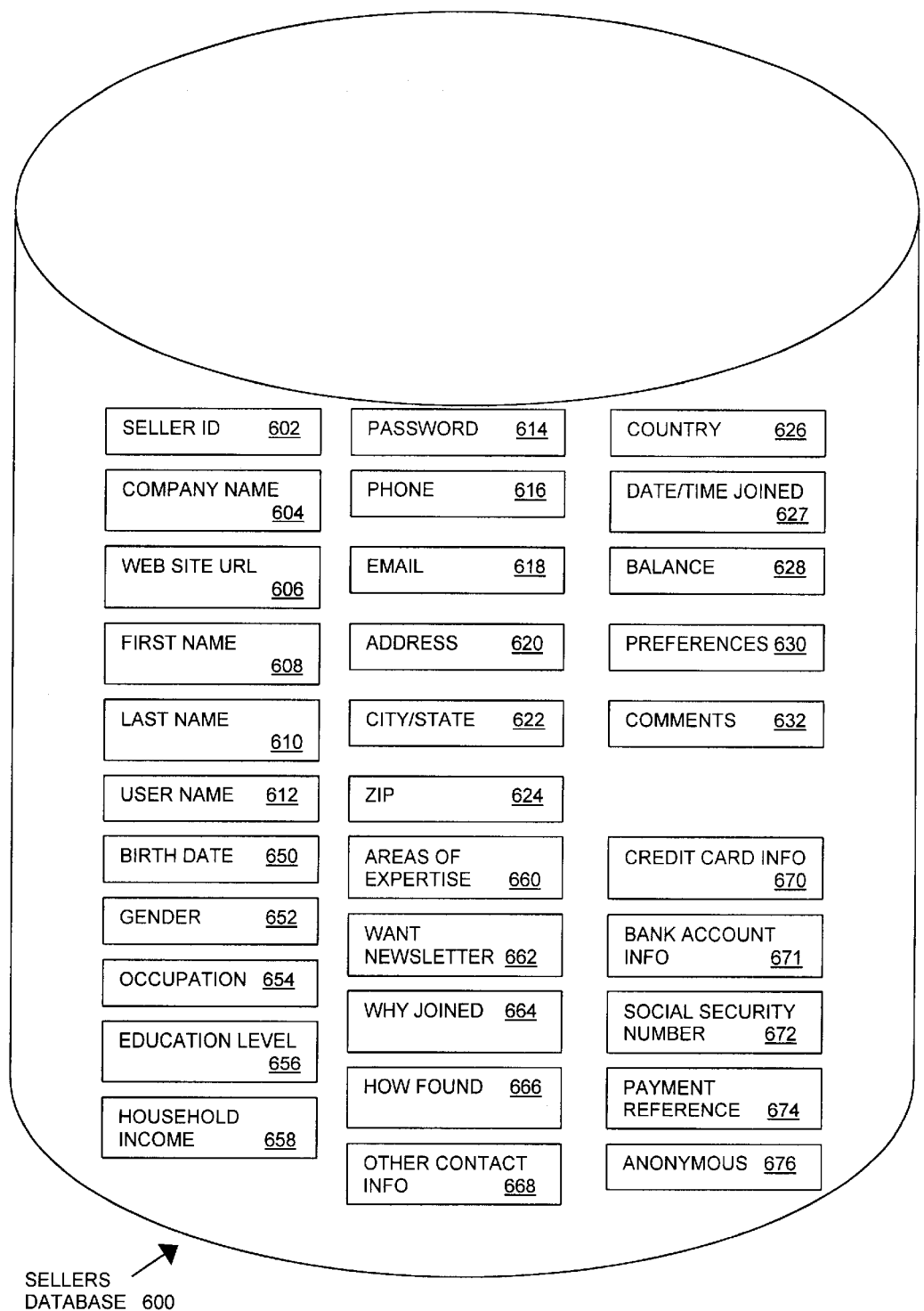
FIG. 6b illustrates another embodiment of the Sellers database in which additional seller information is included.

Referring to FIG. 6b, in various embodiments, some information is stored in this database in.addition to that shown in FIG. 6a. Here are some examples of additional data which exist in some embodiments and which could be stored in this database (note that for numbered drawing elements which appear in both FIG. 6a and FIG. 6b, the numbers refer to the same elements in both):

Birth Date 650 stores information on when the person was born, to be used to confirm that the seller is of legal age, not a minor.

Gender 652 stores information about whether the seller (or the primary contact person if the seller is a company) is male or female, demographic information that might be of use to some buyers.

Occupation 654 stores information about what occupation the seller is (or what type of company the seller is, if the seller is a company), demographic information that might be of use to some buyers.

Education Level 656 stores information about what education level the seller achieved (if the seller is an individual), demographic information that might be of use to some buyers.

Household Income 658 stores information about the approximate annual household income of the seller (if the seller is an individual), demographic information that might be of use to some buyers.

Areas of Expertise 660 stores information about the specific areas of expertise of the seller and/or types of items the seller has or is likely to be able to provide, information that might be of use to some buyers. In one embodiment, there is an additional table to store detailed information about seller expertise or specific types of items that a seller has for sale. The expertise or items could be classified according to type/category. In one optional feature of this embodiment, there are several levels of expertise for a given skill or area (i.e. expert, significant experience, some experience, etc.). In another optional feature of this embodiment, a seller has to pass a test or meet certain other qualifications in order to qualify as an expert. In another optional feature of this embodiment, penalties are imposed for sellers who claimed to be experts in a specific area but later turned out not to be, either by not having the claimed specific qualifications or by not having a sufficiently high average payment for transactions of the type in which the seller claimed to be an expert.

Want Newsletter 662 stores information about whether the seller wants to receive periodic emails from the system operator about general system news and related information.

Why Joined 664 stores information about why the seller joined the system, which might be useful to the system operator for marketing purposes.

How Found 666 stores information about how the seller discovered the system, which might be useful to the system operator for marketing purposes.

Other Contact Info 668 stores information about other ways to contact the seller, such as pager number, voicemail address, and fax number.

Credit Card Info 670 stores the seller's credit card information, for the purposes of identification or for embodiments which allow sellers to receive payments by credit card.

Bank Account Info 671 stores the seller's bank account information, for the purposes of identification or for embodiments which allow sellers to receive payments directly to their bank accounts.

Social Security Number 672 stores the seller's social security number if the seller is an individual, or a company's Federal Employer Identification Number if the seller is a company, for the purposes of identification.

Payment Preference 674 lets the seller indicate how he/she prefers to receive payment for items, for embodiments which allow multiple payment methods.

Anonymous 676 lets the seller choose to remain anonymous, identified only by a consistent ID rather than his/her name or company name. For numerous privacy and competitive reasons, sellers might prefer not to have their identities revealed to the general public when engaging in commercial transactions.

Figure 7A:
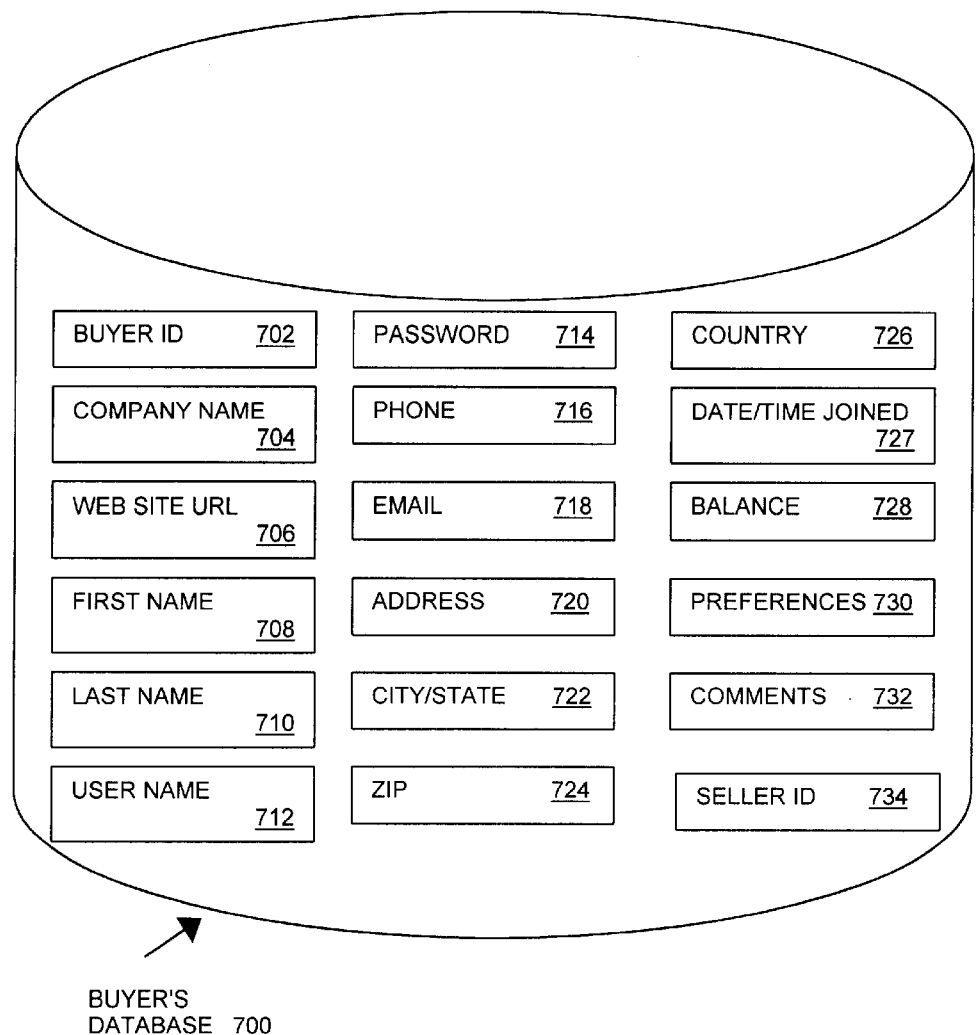
FIG. 7a illustrates one embodiment of the Buyers database.

Referring to FIG. 7a, Buyers database 700 maintains data on individuals, companies and other entities which are or want to be buyers, such as Buyer ID 702, Company Name 704, Web Site URL 706, First Name 708, Last Name 710, User Name 712, Password 714, Phone 716, Email 718, Address 720, City/State 722, Zip 724, Country 726, Date/Time Joined 727, Balance 728, Preferences 730, Comments 732, and Seller ID 734. In a preferred embodiment, Buyers database 700 has one record (row) for each buyer. Buyer ID 702 is a unique identifier for the buyer. Company Name 704 stores the name of the company if the buyer is a company, otherwise it is blank. Web Site URL 706 is the URL for the home page of the company's web site if the company has a web site, otherwise it is blank. First Name 708 stores the first name of the buyer, or the first name of the primary contact person if the buyer is a company. Last Name 710 stores the last name of the buyer, or the last name of the primary contact person if the buyer is a company. User Name 712 stores the name by which the buyer will be identified throughout the system. Password 714 stores the password which the buyer will use to gain access to areas which are password-protected and areas which require authenticated identification. Phone 716 stores the phone number of the buyer. Email 718 stores the email address of the buyer. Address 720 stores the address of the buyer (e.g. 123 Main Street). City/State 722 stores the city and state of the buyer. Zip 724 stores the zip code of the buyer. Country 726 stores the country of the buyer. Date/Time Joined 727 stores the date and time when the buyer joined the system. Balance 728 stores the current balance of the buyer, if the total payments the buyer has made to the system operator exceed the amounts the buyer has paid for items he/she purchased. Preferences 730 stores the buyer's preferences about the various settings within the system which the buyer has full or partial control over, such as the format in which various information is displayed. Comments 732 stores any comments that the system operator enters about the buyer. Seller ID 734 stores the same number as the Seller ID 602 if the buyer also happens to be a seller, which is permitted in a preferred embodiment.

In various embodiments, some of this information is stored on buyer's interface 300, such as through a text file, database file or a "cookies" file.

Figure 7B:
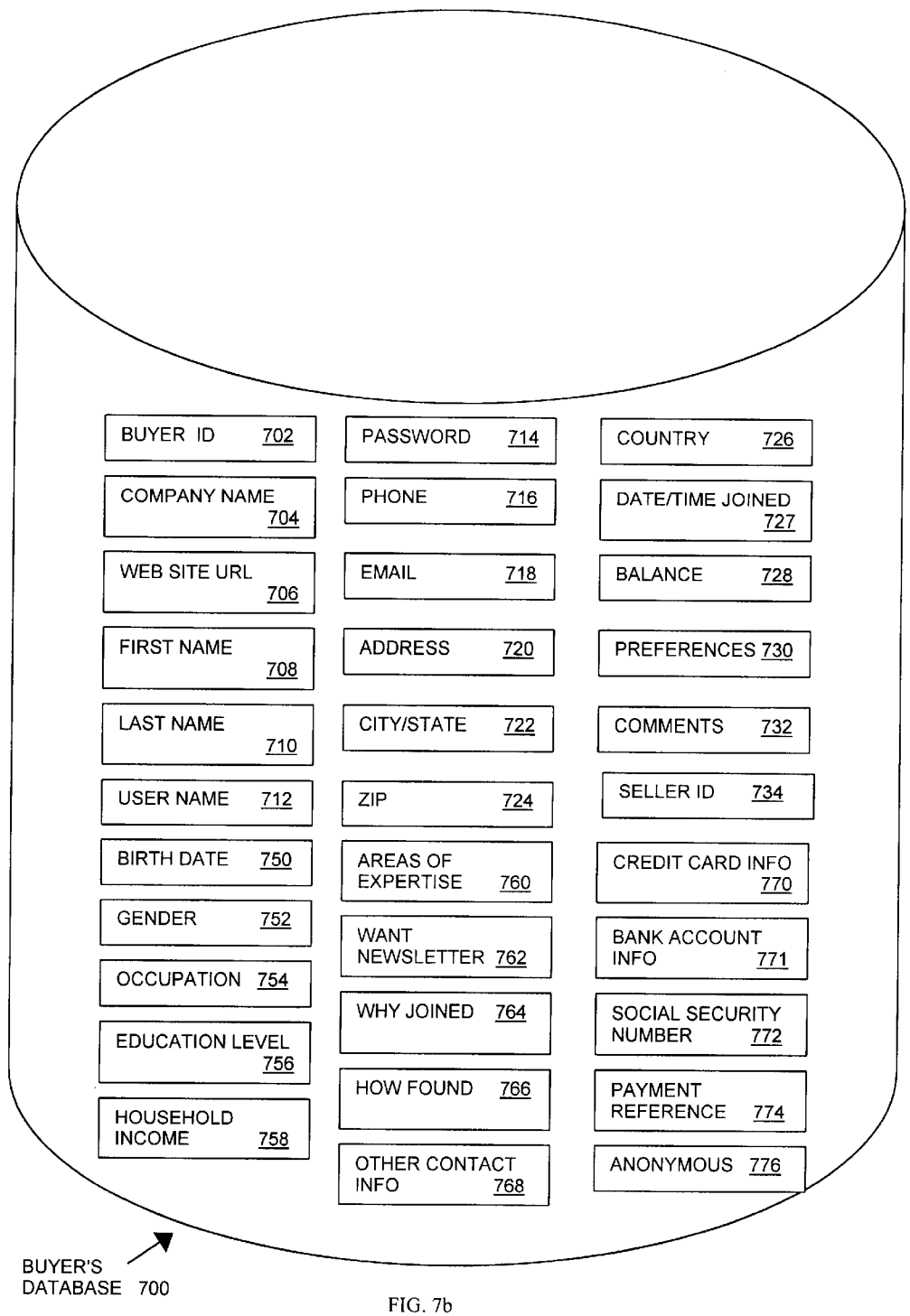
FIG. 7b illustrates another embodiment of the Buyers database in which additional buyer information is included.

Referring to FIG. 7b, in various embodiments, some information is stored in this database in addition to that shown in FIG. 7a. Here are some examples of additional data which exist in some embodiments and which could be stored in this database (note that for numbered drawing elements which appear in both FIG. 7a and FIG. 7b, the numbers refer to the same elements in both):

Cutoff Percentile 750 stores the minimum percentile cutoff of eligible sellers for this buyer. This is the value that the buyer has entered, indicating the lowest acceptable percentile of sellers, in terms of their average payments received for items. In a preferred embodiment, sellers below this threshold are not able to provide items to the buyer.

Birth Date 752 stores information on when the person was born, to be used to confirm that the buyer is of legal age, not a minor.

Gender 754 stores information about whether the buyer (or the primary contact person if the buyer is a company) is male or female, demographic information that might be of use to some sellers.

Occupation 756 stores information about what occupation the buyer is (or what type of company the buyer is, if the buyer is a company), demographic information that might be of use to some sellers.

Education Level 758 stores information about what education level the buyer achieved (if the buyer is an individual), demographic information that might be of use to some sellers.

Household Income 760 stores information about the approximate annual household income of the buyer (if the buyer is an individual), demographic information that might be of use to some sellers.

Want Newsletter 762 stores information about whether the buyer wants to receive periodic emails from the system operator about general system news and related information.

Why Joined 764 stores information about why the buyer joined the system, which might be useful for marketing purposes.

How Found 766 stores information about how the buyer discovered the system, which might be useful for marketing purposes.

Other Contact Info 768 stores information about other ways to contact the buyer, such as pager number, voicemail address, and fax number.

Credit Card Info 770 stores the buyer's credit card information, for the purposes of identification or for embodiments which allow buyers to make payments by credit card.

Bank Account Info 771 stores the buyer's bank account information, for the purposes of identification or for embodiments which allow buyers to make payments directly from their bank accounts.

Social Security Number 772 stores the buyer's social security number if the buyer is an individual, or a company's Federal Employer Identification Number if the buyer is a company, for the purposes of identification.

Payment Preference 774 lets the buyer indicate how he/she prefers to make payments for items, for embodiments which allow multiple payment methods.

Anonymous 776 lets the buyer choose to remain anonymous, identified only by a consistent ID rather than his/her name or company name. For numerous privacy and competitive reasons, buyers often prefer not to have their identities revealed to the general public when engaging in commercial transactions.

In some embodiments, such as those in which a significant proportion of participants sometimes act as a buyers and sometimes as sellers, the Sellers database 600 and Buyers database 700 are replaced by a single database.

Figure 8:
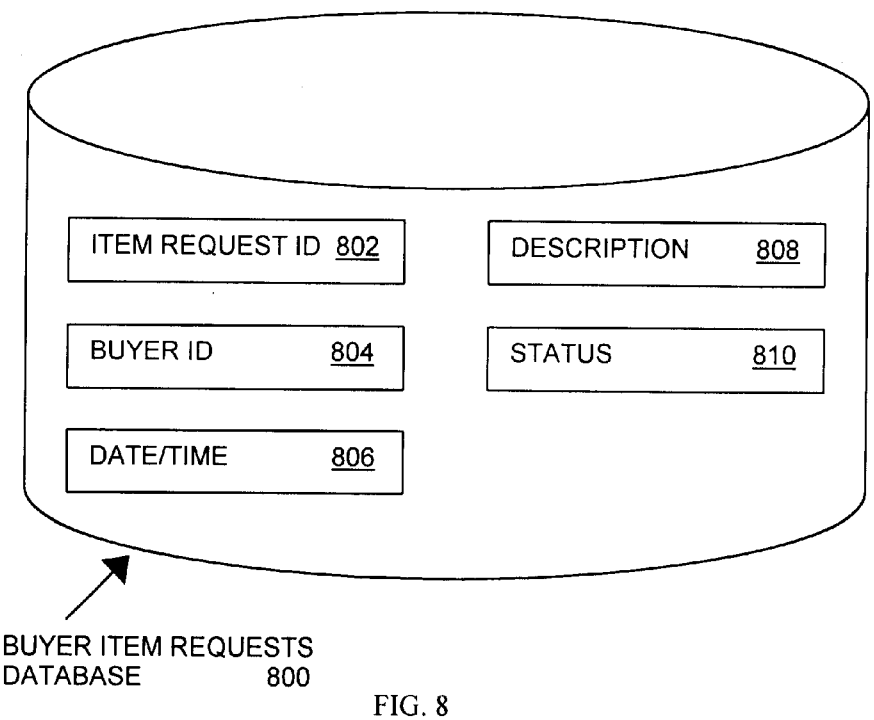
FIG. 8 illustrates one embodiment of the Buyer Item Requests database.

Referring to FIG. 8, Buyer Item Requests database 800 maintains data on requests that buyers make for items and types of items (in those embodiments which allow for such requests), such as Item Request ID 802, Buyer ID 804, Date/Time 806, Description 808, and Status 810. One example of an item request would be the answer to a specific question: in this case, the item that the buyer is requesting is the answer to the question. In a preferred embodiment, Buyer Item Requests database 800 has one record (row) for each item or type of item requested by each buyer. Item Request ID 802 is a unique identifier for the item request. Buyer ID 804 is the number corresponding to Buyer ID 702 for the buyer making the item request. Date/Time 806 stores the date and time at which the item request was made. Description 808 stores a description of the requested item, type of item, or area of expertise. Status 810 stores the current status of the item request. For example, the status could be 'open' or 'closed', and if it's closed then Status 810 also indicates the value for Item ID 502 corresponding to the item which fulfilled the request.

In some embodiments, Buyer Item Requests database 800 is not used and the information it includes is instead included in Buyers database 700.

Figure 9:
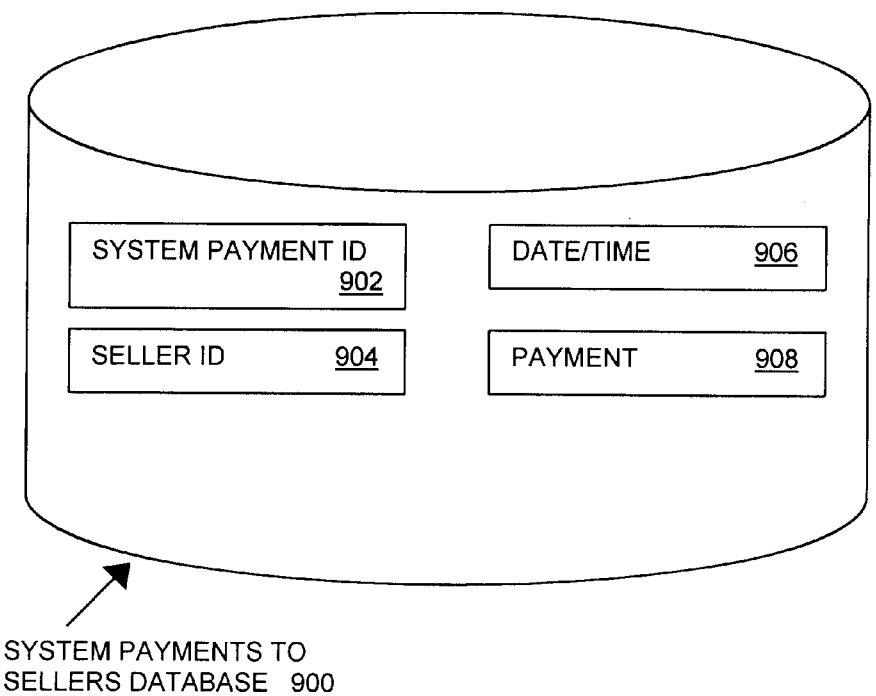
FIG. 9 illustrates one embodiment of the System Payments to Sellers database.

Referring to FIG. 9, System Payments To Sellers database 900 maintains data on payments made by the system operator to sellers, such as System Payment ID 902, Seller ID 904, Date/Time 906, and Payment 908. In a preferred embodiment, System Payments to Sellers database 900 has one record (row) for each payment the system operator makes to any seller. System Payment ID 902 is a unique identifier for each system payment. Seller. ID 904 stores the value in Seller ID 602 for the seller who received or will receive the payment. Date/Time 906 stores the date and time at which the payment is made from the system operator to the seller. Payment 908 stores the amount of the payment.

Referring to FIG. 10, Buyer Payments To System database 1000 maintains data on payments made by buyers to the system operator, such as Buyer Payment ID 1002, Buyer ID 1004, Date/Time 1006, and Payment 1008. In a preferred embodiment, Buyer Payments To System database 1000 has one record (row) for each payment a buyer makes to the system operator. Buyer Payment ID 1002 is a unique identifier for each buyer payment. Buyer ID 1004 stores the value in Buyer ID 702 for the buyer who made or will make the payment. Date/Time 1006 stores the date and time at which the payment is made from the buyer to the system operator. Payment 1008 stores the amount of the payment.

Figure 11:
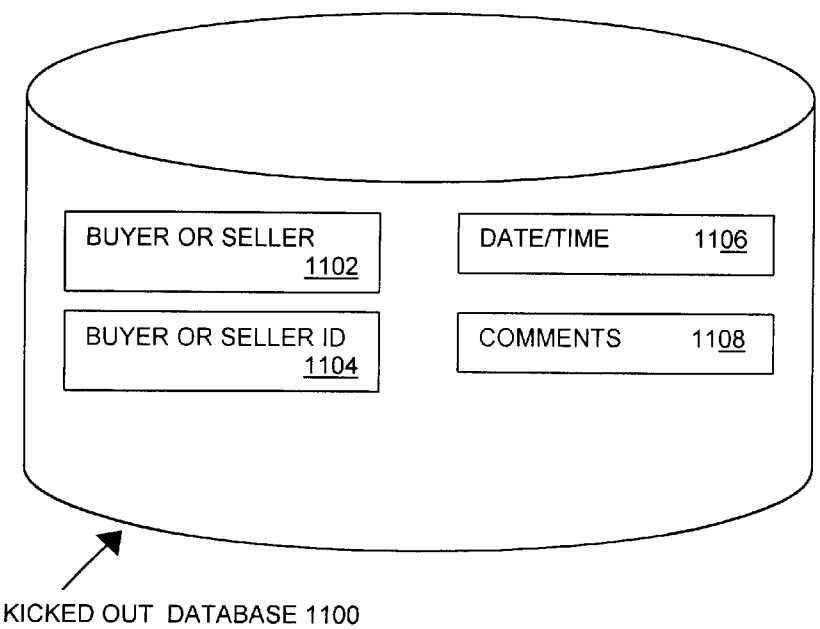
FIG. 11 illustrates one embodiment of the Kicked Out database.

Referring to FIG. 11, Kicked Out database 1100 maintains data on which participants have been kicked out of the system, such as for rule violations, and should not be allowed to rejoin (in those embodiments which track such information), such as Buyer Or Seller 1102, Buyer Or Seller ID 1104, Date/Time 1106, and Comments 1108. In a preferred embodiment, Kicked Out database 1100 has one record (row) for each buyer or seller who has been kicked out of the system. Buyer Or Seller 1102 stores information on whether the participant was a buyer, a seller, or both. Buyer Or Seller ID 1104 stores the value in Seller ID 602 for this participant if he/she was a seller, or the value in Buyer ID 702 for this participant if he/she was a buyer or both a buyer and a seller. Date and Time 1106 stores the date and time when the participant was kicked out of the system. Comments 1108 stores details about why the participant was kicked out of the system, and is entered by the system operator.

In some embodiments, Kicked Out database 1100 is not used and the information it includes is instead included in Sellers database 600 and Buyers database 700. In a preferred embodiment, poorly performing participants (based on a variety of criteria, such as low average payments for buyers or sellers, or a significant number of late or missed payments for buyers) and rule violators can be removed from the system and/or other sanctions can be imposed.

Operation of Invention

Figure 12:
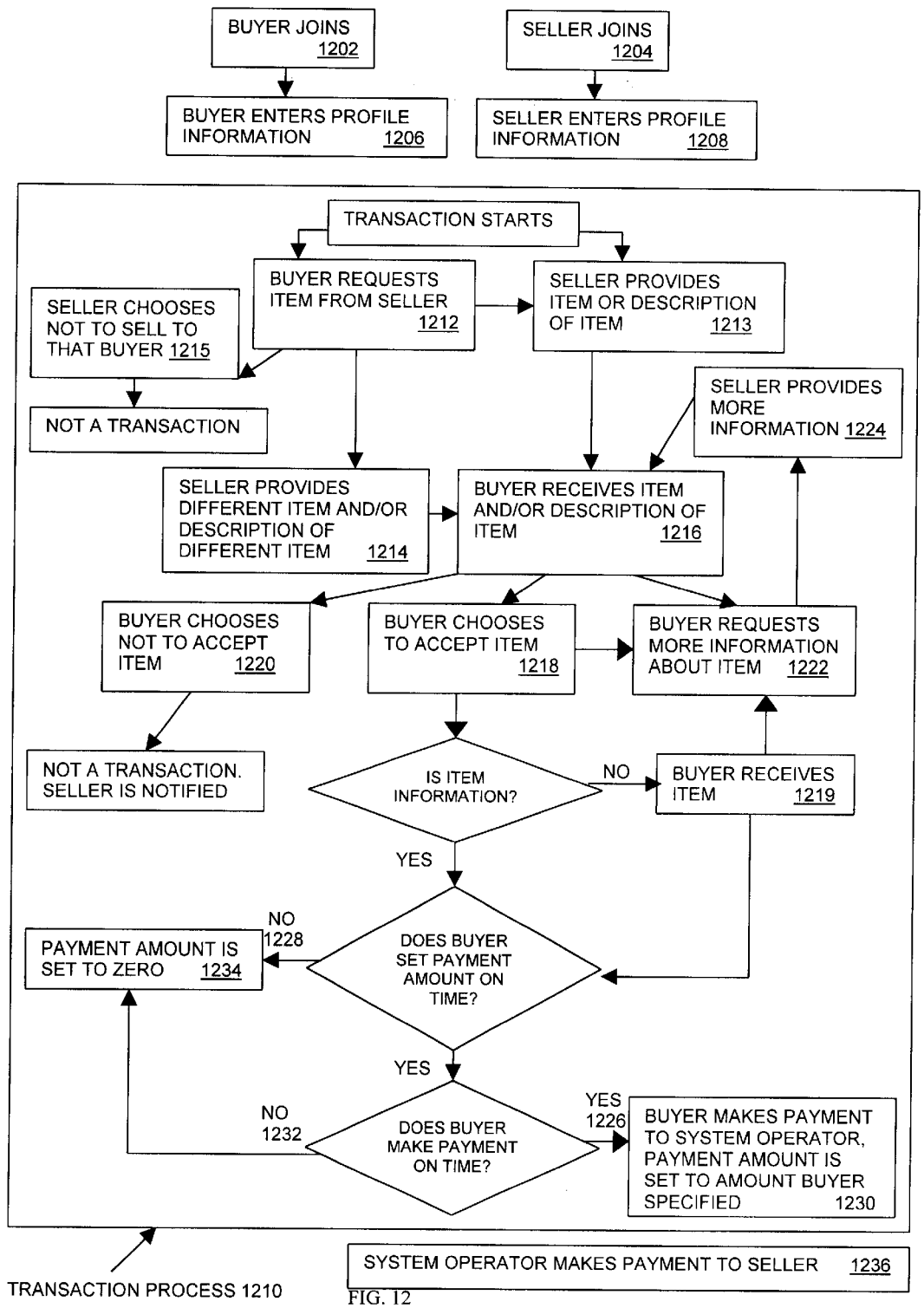
FIG. 12 illustrates one embodiment of the information and payments related to a given transaction.

Referring now to FIG. 12, there is described one embodiment of the flow of information and payments related to a given transaction in the system. Before a transaction can occur between a buyer and a seller, each must join the system (1202 and 1204 respectively) and enter some profile information (1206 and 1208 respectively). In a preferred embodiment, this is done through Buyer Registration form 1400 and Seller Registration form 2000. In a preferred embodiment, the participant can join and enter the profile information at the same time, or can join and then later enter his/her profile information. In another embodiment, both must be entered at the same time.

The steps involved in a single transaction in a preferred embodiment are illustrated in Transaction Process 1210. In a preferred embodiment, a transaction can begin in two different ways: either a buyer requests a specific item from a seller using Buyer Item Request form 1700, probably after searching using Buyer Searches For Sellers form 1600, or a seller provides an item or a description of an item using Seller Provides Item form 2300 (1212 and 1213 respectively). In the former case (1212), the seller then either provides the item or a description of the item using Seller Provides Item form 2300, or provides a different item or a description of a different item using Seller Provides Item form 2300, or chooses not to provide the item or description in which case the transaction ends (1213, 1214, and 1215 respectively). These actions of the buyer and seller are stored in Items database 500.

Still referring to FIG. 12, the buyer receives the item or description (1216), and then either chooses to accept the item, chooses not to accept the item (an option available only in some embodiments) in which case the transaction ends and the seller is notified in case he/she wants to provide the item to another buyer, or requests that the seller provide more information or answer specific questions (1218, 1220, and 1222 respectively). In case 1222, the seller can provide more information (1224), resulting in a repeat of step 1216. In case 1218, if the item resulted from an item request by the buyer, Status 810 (FIG. 8) is set to 'closed'. Also in case 1218, if the thing which is provided is a description (rather than the actual item), there is an intermediate step 1219 in which the actual item is provided. Whether the thing provided is a description or an actual item, the next step (after 1218 and 1219 respectively) is one of the following: either the buyer sets a payment, or the buyer still hasn't set a payment amount after a predetermined period of time, or the buyer requests more information from the seller (1226, 1228, and 1222 respectively). In case 1222, the seller can provide more information (1224), resulting in a repeat of step 1216. In case 1228, the payment amount for this transaction is set to zero. In case 1226, either the buyer subsequently makes a payment to the system operator to cover this item's payment, or the buyer still hasn't made the specified payment after another predetermined period of time (1230 and 1232 respectively). In case 1232, the payment amount for this transaction is set to zero. In a preferred embodiment, if the seller is unhappy about the amount of the payment for a given item, the seller does not have the ability to undo the transaction and get the item back. In another embodiment, the seller is able to undo the transaction for certain types of transactions and under certain circumstances.

In some embodiments, the buyer is able to reject items that sellers have provided to him/her (1220). In other embodiments, the buyer is not able to reject items. In still other embodiments, the buyer can reject an item only if all that has been provided is a description of the item rather than the actual item.

In a preferred embodiment, participants have the option of being notified, such as by email, voicemail, or pager, in some or all circumstances when the status of a transaction changes; and they are also able to log in to their account to check this and other information. In another embodiment, such alerts are mandatory, not optional. In another embodiment, no such alerts are provided, and participants must log in to their account to check this and other information.

Referring once more to FIG. 12, sellers receive payments from the system operator for transactions which resulted in nonzero payments (1236). In a preferred embodiment, such payments are made at a specific frequency, such as monthly, and only when such payments owed to a given seller total at least a certain predetermined amount.

Figure 13:
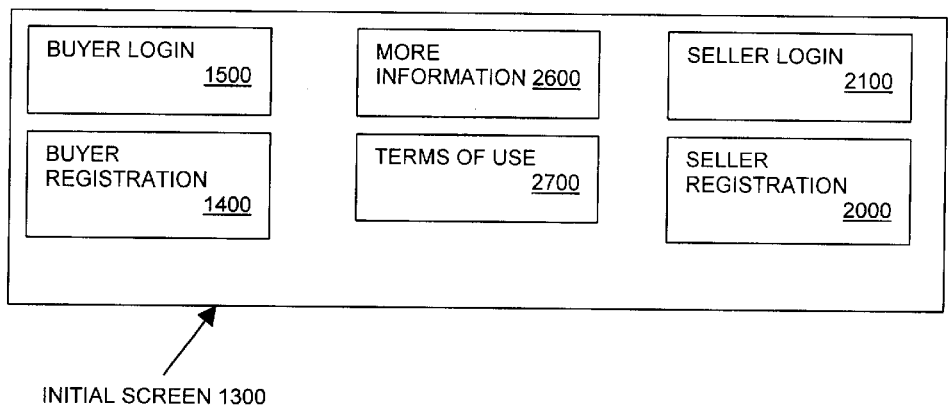
FIG. 13 illustrates one embodiment of the Initial Screen, the central starting point for all participant activities.

Referring to FIG. 13, there is described one embodiment of the initial screen that buyers, sellers and the system operator can use to log in to the system. In a preferred embodiment, this is a web page that includes links to Buyer Login form 1500, Seller Login form 2100, Buyer Registration form 1400, Seller Registration form 2000, More Information page 2600, and Terms of Use page 2700.

Referring to FIG. 14, there is described one embodiment of the Buyer Registration form, which enables individuals, companies and other entities to register to participate as buyers in the system. The form includes Company Name, Site Name (for those participants which have web sites), URL (for those participants which have web sites), Category (which lets them indicate which category or categories they might want to express an interest in being a buyer of items for), Date/Time (which is filled in automatically), Name 1410, Password 1412, Phone Number, Email Address, Postal Mail Address, Initial Payment, Preferred Payment Method 1413, and Additional Payment Information 1415. In a preferred embodiment, the buyer acknowledges that by registering and using the system, he/she understands that transactions he/she enters into form legally binding contracts. When a buyer registers, the system compares Kicked Out database 1100 with Sellers database 600 and Buyers database 700 to see if a buyer or seller with the same first name and last name, company name, address, credit card number, and/or Social Security number has already been kicked out of the system. If the buyer has not already been kicked out of the system and the buyer meets any other requirements, the buyer is accepted into the system and the information he/she entered is placed in Buyers database 700. In a preferred embodiment, this form also enables an existing buyer to update his/her information. In one embodiment, this form also includes an Item Request link 1417, which takes him/her to Buyer Item Request form 1700, enabling him/her to make item requests.

Preferred Payment Method 1413 might include credit cards, personal checks, electronic funds transfer, digital money, and other methods. Additional Payment Info 1415 will vary depending on Preferred Payment Method 1413. Such payment info might include credit card number or bank account number. If the buyer wants to pay by credit card, for example, payment data includes his/her credit card account number, expiration date, name of issuing institution, and credit limit. For electronic funds transfer, payment data includes the name of the buyer's bank and his/her account number. These payment methods are meant to be merely illustrative, however, as there arc many equivalent payment methods commonly known in the art which may also be used.

In a preferred embodiment, the buyer has the option of specifying certain requirements of eligible sellers, either for all of that buyer's items (1430 in FIG. 14), and/or for certain types of items, and/or for specific item requests (1710 in FIG. 17). Sellers not meeting the requirements are not able to provide items to that buyer. In another embodiment, this option is not present. Here are examples of some such requirements in various embodiments:

I. The buyer can specify a minimum average payment of eligible sellers (either overall, or for this type of item if it's a specific type of item). This could be expressed in terms of a "cutoff percentile" (1414), which enables the buyer to screen out sellers who have an average payment below the specified percentile. For example, if a buyer specifies the 50th percentile as a cutoff, and 50% of all sellers have an average payment of $2.50 or above, then only those sellers who have an average payment of $2.50 or more are able to provide items to this buyer. In one optional feature of this embodiment, percentiles are calculated based on all interactions to date; in another, they're calculated based on all transactions in the last X months; in another, they're calculated based on participants who are currently active, as defined by some quantifiable measure. In another optional feature of this embodiment, percentiles are calculated based only on payments which were actually made; in another, they're calculated based on both payments made and payments assigned but not yet made and also not yet past due. In another optional feature of this embodiment, a buyer can specify one cutoff percentile for him/her overall, and another cutoff percentile for one or more templates he/she has filled out for specific types of items or areas of expertise. In another optional feature of this embodiment, a buyer can select specific sellers that they don't want to receive items from, even if those specific sellers would have otherwise been eligible to provide items to that buyer. In another optional feature of this embodiment, sellers with average payments below the cutoff percentile can still give items under exceptional circumstances, such as when they feel the value of the item is very high. In these cases, the buyer would generally be expected to provide no payment unless the item was judged by the buyer to be truly exceptional. In general, cutoff percentile (C) and average payment (P) will be positively correlated. In other words, a buyer with a high P will probably have a high C, and vice versa. The reason is that if P is high and C is low, the buyer would tend to get more, lower quality items, which will pull C down. Similarly, if C is high and P is low, the buyer would tend to get very few items. Some buyers might want this, but most would probably react by lowering their C to get more items.

II. A buyer can specify a minimum number of previous transactions for eligible sellers (1416). In other words, sellers who haven't yet completed a specified minimum number of transactions are not able to provide items to that buyer. The minimum number is determined by the buyer (in one embodiment) and/or the system operator (in another embodiment). In one embodiment, buyers and/or sellers not having some minimum number of transactions completed are automatically excluded from percentile ranking calculations and/or eligibility for some transactions; in another, they are automatically included; in another, the buyer has the choice of including or excluding such sellers.

III. A buyer can exclude individual sellers who otherwise meet that buyer's criteria, or can include individual sellers who don't otherwise meet that buyer's criteria (1420). A buyer might want to do this, for example, if he/she previously transacted with the seller and had an especially good or bad experience.

IV. The system can have sub-communities, based on the types of items buyers can request, and/or the types of items that sellers can indicate an interest in selling and/or specify as areas of expertise (1422). Buyers can specify a given sub-community as a criteria in their definition of which sellers are eligible to provide information to them.

V. This form also enables a buyer to specify other criteria that sellers must satisfy in order to be able to sell items to this buyer (1418).

Referring to FIG. 15, there is described one embodiment of Buyer Login form 1500, through which buyers enter their Name (1410 in FIG. 14) and Password (1412 in FIG. 14) in order to log in to the system (1502). The Buyers database is checked to confirm that the Name and Password that have been entered correspond to a registered buyer. If login is successful, they can perform a variety of activities such as: click on Buyer Searches For Sellers link 1504 to go to Buyer Searches For Sellers form 1600; click on Buyer Item Request link 1506 to go to Buyer Item Request form 1700; click on Buyer Views Items link 1508 to go to Buyer Views Items page 1800; and click on Buyer Account Information link 1510 to go to Buyer Account Information page 1900. The buyer can also click on Buyer Specifies Acceptable Sellers 1512 to go to Buyer Specifies Acceptable Sellers form 3200 to specify, characteristics of sellers that the buyer is willing to accept items from. In one embodiment, the buyer can also click on Top Listings link 15 14 to go to Top Listings page 2800. Update Registration Information 1516 enables the buyer to change some of the registration information he/she entered upon initially joining the system. In some embodiments, various other information which would be of use to buyers is included on this page.

In one embodiment, anyone is allowed to participate as a buyer or a seller. In another embodiment, some or all participants must meet certain requirements, such as filling out an application, taking a test, passing a credit check, or meeting certain demographic criteria or other requirements. In one embodiment, the system has certification testing for sellers and/or buyers. In one optional feature of such an embodiment, certification testing is a requirement for joining; in another, it is not a requirement but the pass/fail grade information is included in the participant's profile and some or all other participants can see it, and in one optional feature of such an embodiment, some or all other participants can choose to transact only with those who passed the test.

Referring to FIG. 16, there is described one embodiment of Buyer Searches For Sellers form 1600, which enables buyers to search the database for specific types of sellers and/or items. FIG. 16 shows some examples of searches this form might allow, such as: searching all sellers 1602; searching by items 1604 (which would show information, goods, services, or all three); searching by area of expertise 1606; searching by occupation 1608; searching by specific text 1610; searching/screening by seller's average payment 1612; searching/screening by seller's number of completed transactions 1614; and searching by comments other participants have made about a seller, for embodiments which include this feature (1615). Multiple search criteria can be specified, enabling buyers to search for very specific types of sellers and/or items, for example: displaying all items that are services from sellers whose occupation is lawyer and whose average payment is greater than $5 and whose number of completed transactions is at least 20. Such queries can be written with standard SQL to return records from the various databases in Data Storage Device 220. The results of the search (1616) are displayed, either on the same page or on a subsequent page, in such a way that the buyer is able to initiate a transaction by clicking on one of them and going to Buyer Item Request form 1700 (for those embodiments which include this form) and making an item request.

In a preferred embodiment, some subset of the information about participating sellers and buyers is available to sellers, some subset of the information about participating sellers and buyers is available to buyers (primarily through Buyer Searches For Sellers form 1600 in FIG. 16, Seller Searches For Buyers form 2200 in FIG. 22, Top Listings page 2800 in FIG. 28, and Participant Directory 2900 in FIG. 29), and some information is not made available to anyone other than the system operator. In one embodiment, contact information such as phone number, email address, and possibly the participant's name are not made public, either for all participants (this is designed to enable the system to discourage disintermediation, in which the participants bypass the system and transact business directly) or for those who want it (some participants might want anonymity). In some embodiments, a participant has partial control over what information about that participant is available to others through the system. For example, if anonymity is desired, a participant's ID rather than the person's or company's name might be displayed.

Some information regarding a given buyer's or seller's earlier transactions can be viewed by buyers and sellers (and sometimes even visitors who aren't yet participants), in order to enable other buyers and sellers to better determine whether they wish to enter into transactions with the buyer or seller. Such data may include (in some embodiments) but not be limited to: number of transactions; average payment (in a preferred embodiment, mean payment is used; in another embodiment, median payment or some other calculated average is used); timeliness of payments (e.g. percent assigned on time, percent paid on time, percent ever paid); and comments and/or ratings from those who have transacted with that buyer/seller. In one embodiment, when searching the database for potential transactions, buyers and/or sellers are able to screen by this type of criteria.

In one embodiment, the system publishes the approximate number of transactions each participant has had thus far, (e.g. 0–10, 10–100, 100–1000, etc.) to help participants know approximately how active a given other participant has been. In another embodiment, the system publishes the exact number of transactions thus far for each participant.

In one embodiment, participants have some control over which of their data are revealed (ex. payment info, etc.). Obviously, to not reveal some information could be looked at negatively by other participants, who might assume the worst and choose not to do business with that participant; and this will incentivize participants not to hide their data even if they're able to.

In one embodiment, some information for participants isn't made available through the system until that participant has had a certain minimum number of transactions. For example, if a list of top average payments is published within the system (as it is in one embodiment), this rule would prevent a participant from reaching the top of the list with just one or two large payments. In another embodiment, there is no such minimum.

Referring to FIG. 17, there is described Buyer Item Request form 1700, which exists in some embodiments. It enables buyers to specify items they would like to buy. They can indicate specific items (1702) or types of items (1704). They can also indicate what types of sellers they are interested in buying such items from: a specific seller or list of specific sellers (1706); a type or types of sellers (1708); or other required seller criteria (1710). In some embodiments, there is one standard form for buyers to make item requests, but there are also a variety of other item request templates (1712) for specific categories, classes, and types of item requests, such as:

a. web site testing and feedback
  b. document review (for grammar, professionalism, legal, etc.)
  c. specific question answering, help, advice
  d. request for resources (books, sites, etc.) for a specific subject or question
  e. research request, fact checking, survey completion
  f. consultant needed, contract work
  g. recruiting employees
  h. new product names
  i. any type of activity that is companies often outsource
  j. product wanted to.purchase
  k. anything that people often have trouble finding (i.e. lead generation, affiliate programs, and big-ticket items like houses, apartments, or cars)
  l. specific requests: a buyer can make a request for item suggestions, one or more of which will be selected (in one embodiment, a buyer can indicate that he/she might be willing to pay a certain amount or an approximate amount for the best response they receive (ex. for new product name, an ad campaign idea, a slogan, a jingle, etc.), or he/she can split that between sellers, whatever way the buyer wants. The buyer can also make a request without an indication of expected payment.)

Each of the above types of specific request forms has some required fields and/or some optional fields, which one skilled in the art could create without difficulty. The entered information is stored in Buyer Item Requests database 800, or in some embodiments could be stored in a separate database. In one embodiment, sellers who meet the required criteria receive the item request, either by being alerted or by seeing it on Seller Searches For Buyers form 2200. In one embodiment, a buyer can optionally provide guidance about what payment amount they might be willing to pay for the desired item (1714).

In a preferred embodiment, a buyer can specify one cutoff percentile for sellers providing items in general and another cutoff percentile for sellers providing items in response to item requests (1720). In another embodiment, a buyer can specify a cutoff percentile for each item request he/she makes.

In one embodiment, although a buyer is able to make item requests to specific sellers 1706, he/she can only choose from among those sellers who are willing to accept item requests from buyers who meet the sellers' requirements, such as the buyer having an average payment of at least a certain amount (i.e. a cutoff percentile for the buyers, analogous to the one buyers have for sellers in some embodiments).

Referring to FIG. 18, there is described one embodiment of Buyer Views Items page 1800, which enables buyers to view all the items that sellers have provided to this buyer by filling out Seller Provides Item form 2300, and optionally set payment amounts for them. For each such item, the page displays: the actual item if the item is information (1802) or a description of the item (1804); the seller (1806); and the date/time at which the seller provided the item (1808). This form gives the buyer the ability to set a payment amount or view a previously set payment amount (1810), or to send a note to the seller requesting more information about an item or provide comments to the seller (1814), which will also appear on 2414 on FIG. 24. When the buyer sets the payment amount for an item, the date/time on which this happens will subsequently appear in 1812, and the buyer has a predetermined period of time in which to make a payment to the system operator to pay for the item.

In a preferred embodiment, the buyer has a predetermined amount of time after the information is entered in which to assign the payment (if any), and a predetermined amount of time (either after the information is entered or after the payment is assigned) in which to pay (in the non-prepayment embodiment). In a preferred embodiment, for transactions in which the buyer and seller are corresponding about the item, the clock 'resets to zero' (i.e. the buyer again has the full amount of time) when the seller sends a message; in another embodiment, the clock doesn't reset; in another embodiment, the clock is only "ticking" when the seller is waiting for a message from the buyer and not the reverse (similar to the way a chess clock functions). In one embodiment, the notification that the buyer receives about the information also mentions that this payment clock has begun, and the system operator can give the buyer another notification just before the time expires. In embodiments requiring prepayment, there obviously are not any payments made late (although some payment amounts might still be assigned late). In such cases, each buyer has his/her own billing date, probably once per month (or all buyers have the same billing date, probably once per month). All payments assigned by that date will be billed in a single bill on that date. The buyer will have a predetermined number days to pay the bill. If they don't pay on time, the payments for all those items will be set to zero, but if the buyer later pays, those items will be set to the correct numbers (the database will differentiate between an assigned zero payment and a late-payment zero payment). In one embodiment, sellers are paid by the system operator on a regular basis, provided they are owed at least some minimum amount. In one embodiment, buyers have to pay an additional fee for late payments. In one embodiment, payments can be non-cash, such as products, services, product discounts, or system credits.

In a preferred embodiment, any payment amount (dollars and cents) is acceptable; in another embodiment the amounts are restricted (ex: some minimum amount, or only certain values). In another embodiment, currencies other than dollars are sometimes permitted (ex. Euro).

In a preferred embodiment, if the buyer has a current balance (from previous payments made to the system operator), or if the buyer is using a credit card to pay for his/her item purchases, payment will be immediately made to the system operator; otherwise, the buyer will have a predetermined amount of time to make a payment to the system operator to cover this payment amount. In other embodiments, the payment options and mechanisms work differently.

If the seller later replies to the buyer's request for additional information by entering it in 2416 on FIG. 24, that information will appear in 1816. In one embodiment, a buyer has the ability to return to this form and change payment amounts that he/she previously assigned, up to the time the payment is made; in another embodiment, a buyer cannot change a payment amount once it is assigned; in another embodiment, a buyer can raise a payment amount, but cannot lower it, once it he/she initially sets it. In one embodiment, if the item corresponds to an Item Request that the buyer has made, the buyer can close the item request (1818) so that no other sellers provide items in response to the item request. The data entered on this form is written to, and the data displayed on this form is taken from, Items database 500. If the buyer decides to send a note to the seller, information about the seller, including his/her contact information, is read from Sellers database 600. In one embodiment, the page includes for each communication between buyer and seller any relevant reference IDs (possibly linked) to earlier communications, for that item and/or for all previous interactions between that buyer and that seller. In one embodiment, a buyer has the option (but not the obligation) to assign a payment amount and/or make payment before receipt of the item. For example, a buyer might receive a description of an item (such as a good or service) from a seller, and decide to assign a payment amount and/or make payment before receipt of the actual item (in other words, the buyer can use the pay-after-receipt technique of the present invention for some items and the more conventional pay-before-receipt technique for others).

In one embodiment, buyers have the ability to reject items that sellers provide to them. Such embodiments would include a 'reject item' field on Buyer Views Items page 1800.

In one embodiment, buyers and sellers have the ability to optionally transact through traditional protocols, such as auction, negotiation, buyer sets price before transaction, and seller sets price before transaction. In such an embodiment, buyers and sellers could use 1814 and 1816 in FIG. 18 and 2414 and 2416 in FIG. 24 to work out the details of such an arrangement, or Buyer Views Items page 1800 and Seller Views Items page 2400 could have an additional area where buyers and sellers could work out the details of such an arrangement.

Referring to FIG. 19, there is described one embodiment of Buyer Account Information page 1900, which enables a buyer to check his/her account information, including Name, current Date/Time, and Current Account Balance. The page also displays various account metrics, such as the buyer's average payment, number of items bought, average time to pay, and percentage of payments made on time. The page also displays a list of payments the buyer made and the dates on which those payments were made. The data displayed on this page are taken from Buyer Payments To System database 1000 and Items database 500. The page also lets buyers make payments to cover their item purchases (1910). Payments are made by buyers to the system operator. There will usually be a one-to-many correspondence between a buyer's payments to the system operator and a buyer's payment assignments for specific items; in other words, a buyer will make one large payment to the system operator in order to cover the payments for a lot of items all at once. In a preferred embodiment, payments by buyers to the system operator can be made by check and/or credit card. In another embodiment, a micropayment system is an option for the buyer. In one embodiment, a buyer must prepay the system operator an amount which will be used to pay for subsequent items through a declining balance method. In another embodiment, a buyer will not have to prepay but will have to pay the system operator at regular intervals or once a certain balance due has been reached. In one optional feature of those embodiments which allow but don't require buyer prepayment, sellers have access to information about whether a given buyer has a positive balance in his/her account, i.e. whether the buyer will be paying immediately. This would encourage buyers to keep a positive balance, since sellers would be more inclined to provide items to buyers for whom payment from the buyer to the system operator would occur immediately.

In a preferred embodiment, this page enables the buyer to easily view all of the items he/she has received, or any subset of them, at once. For example, the buyer could view all the items that he/she has received and has paid for, all the items that he/she has received and has assigned a payment amount for but not yet paid for, or all the items that he/she has received and hasn't yet assigned a payment for.

In one embodiment, this page shows the buyer his/her average payment and the average payment for the whole network. In another embodiment, this page also shows the buyer his/her average payment to each seller he/she transacted with and the overall average payments for those sellers. In another embodiment, this page also shows the buyer his/her average payment for each item type for those items he/she received and the overall average payments for those item types.

Skipping ahead to FIG. 32, there is described Buyer Specifies Acceptable Sellers form 3200, which exists in some embodiments. It enables buyers to specify that only certain sellers are able to provide items to him/her. The criteria the buyer has to choose from can include the following: accept all sellers (3202); accept those in certain areas of expertise and not others, perhaps by choosing Yes or No from a scrolling list of all areas of expertise (3204); accept those in certain occupations, perhaps by choosing Yes or No from a scrolling list of all occupations (3206); accept those who have an average payment of at least a certain amount, or an average payment of at least a certain percentile of all sellers (3208); accept those who have completed at least a certain number of transactions and/or at most a certain number of transactions (3210). Multiple search criteria can be specified, enabling buyers to be very specific about which sellers they are willing to accept items from. Such queries can be written with standard SQL to return records from the various databases in Data Storage Device 220.

Referring to FIG. 20, there is described one embodiment of Seller Registration form 2000, which enables individuals, companies and other entities to register to participate as sellers in the system. The form includes Company Name, Site Name (for those participants which have web sites), URL (for those participants which have web'sites), Date/Time (which is filled in automatically), Name 2010, Password 2012, Phone Number, Email Address, Postal Mail Address, Occupation, Education Level, Areas of Expertise (site design, graphics, database, programming, marketing, email newsletters, tax, law, finance, or just about any other area of expertise), Preferred Payment Method 2013 (for those embodiments that allow more than one payment method), and Additional Payment Info 2015. In a preferred embodiment, the buyer acknowledges that by registering and using the system, he/she understands that transactions he/she enters into form legally binding contracts.

When a seller registers, the system compares Kicked Out database 1100 with Sellers database 600 and Buyers database 700 to see if a buyer or seller with the same first name and last name, company name, address, credit card number, and/or Social Security number has already been kicked out of the system. If the seller has not already been kicked out of the system and the seller meets any other requirements, the seller is accepted into the system and the information he/she entered is placed in Sellers database 600. In a preferred embodiment, this form also enables an existing seller to update his/her information. In one embodiment, this form also includes a Provide Items link 2023, which takes them to Seller Provides Item form 2300, enabling them to provide items right away.

Preferred Payment Method 2013 might include credit cards, personal checks, electronic funds transfer, digital money, and other methods. Additional Payment Information 2015 will vary depending on Preferred Payment Method 2013. Such payment information might include credit card number or bank account number. In a preferred embodiment, credit card processing is performed by system operator 200. In another embodiment, credit card processing is performed by the seller. If the buyer wants to pay by credit card, payment data would include his/her credit card account number, expiration date, name of issuing institution, and credit limit. If the buyer wants to pay by electronic funds transfer, payment data includes the name of the buyer's bank and his/her account number. Another method of payment involves procedures using digital cash. The practice of using digital cash protocols to effect payment is well known in the art and need not be described here in detail. These payment methods are meant to be merely illustrative, however, as there are many equivalent payment methods commonly known in the art which may also be used.

In one embodiment, Seller Registration form 2000 also enables sellers to fill out one or more template forms for different types of items they have or expect to have available, such as:

a. web site testing and feedback
b. document review (for grammar, professionalism, legal, etc.)
c. specific question answering, help, advice
d. research, fact checking, survey completion
e. consulting, contract work
f. new product names
g. any type of activity that is companies often outsource
h. product buyers might want to purchase
i. anything that people often have trouble finding (i.e. lead generation, affiliate programs, and big-ticket items like houses, apartments, or cars)

Each of the above types of "items-available" template forms has some required fields and/or some optional fields and/or a place where sellers can add fields of their own. Each seller can fill in whichever ones are appropriate. The information entered could be stored as a separate table in Items database 500, Sellers database 600, or another database.

Referring to FIG. 21, there is described one embodiment of Seller Login form 2100, through which sellers enter their Name (2010 in FIG. 20) and Password (2012 in FIG. 20) in order to log in to the system (2102). The Sellers database is checked to confirm that the Name and Password that have been entered correspond to a registered seller. If login is successful, they can perform a variety of activities such as: click on Seller Searches For Buyers link 2104 to go to Seller Searches For Buyers form 2200; click on Seller Provides Item link 2106 to go to Seller Provides Item form 2300; click on Seller Views Items link 2108 to go to Seller Views Items page 2400; and click on Seller Account Information link 2110 to go to Seller Account Information page 2500. In one embodiment, the seller can also click on Top Listings link 2112 to go to Top Listings page 2800. Update Registration Information 2114 enables the seller to change some of the registration information he/she entered upon initially joining the system. In some embodiments, various other information which would be of use to sellers is included on this page.

Referring to FIG. 22, there is described one embodiment of Seller Searches For Buyers form 2200, which enables sellers to search the database for specific types of buyers and/or items. FIG. 22 shows some examples of searches this form might allow, such as: searching all buyers 2202; searching by open item requests 2204 (which would show only those item requests which haven't yet been satisfactorily fulfilled as specified by the buyer using Close Item Request 1818 in FIG. 18); searching by category of buyer 2206; searching by specific text 2208; searching/screening by buyer's average payment 2210; searching/screening by buyer's number of completed transactions 2212; searching by buyer's percentage of on-time payments 2214; and searching by comments other participants have made about a buyer, for embodiments which include this feature (2215). Multiple search criteria can be specified, enabling sellers to search for very specific types of buyers and/or items, for example: displaying all items that include the word 'nanotechnology' and are wanted by buyers whose average payment is greater than $3 and who have made at least 80% of their payments on time. Such queries can be written with standard SQL to return records from the various databases in Data Storage Device 220. The search results 2216 would be displayed, either on the current page or another page, in such a way that the seller is able to initiate a transaction by clicking on one of them and going to Seller Provides Item form 2300 to provide an item. In one embodiment, search results 2216 include information about what items other sellers have supplied in an attempt to satisfy the item request, and what the results were, so that they might build on these efforts and better learn what the buyer is looking for, rather than duplicating prior efforts. In a preferred embodiment, searching by open item requests 2204 will show only those item requests which the seller is capable of responding to, as determined by whether the seller meets the buyer's cutoff percentile requirement and any other specified requirements. In another embodiment, the seller would be able to view, but not to provide items for, item requests for which he/she does not meet the requirements.

Referring to FIG. 23, there is described one embodiment of Seller Provides Item form 2300. This form enables a seller to provide items to buyers through the system. In each transaction, the seller provides the item to one or more buyers, with the understanding that there is no guarantee of any specific compensation. In a preferred embodiment, only those buyers who are interested in receiving items from a seller who fits the description of this seller will appear on this form (as those buyers specified on Buyer Specifies Acceptable Sellers form 3200). For example, if a buyer specifies that he/she only wants items from sellers whose average payment is in the top 20% of all sellers, then sellers who don't meet this requirement are not able to specify such buyers on this form. The seller enters the actual item (if the item is information) or a description of the item (2302), and specifies which of the available buyers the seller wants to sell the item to (2304). The item's description is entered into Items database 500. The seller then provides the specified item to the buyer. This could involve the delivery of physical goods as well as digital goods.

In a preferred embodiment, a seller who has an item which can be used by multiple buyers (such as most types of information) can provide such an item. In one optional feature of this embodiment, items of this type are identified as such, so that buyers would know that other buyers may also be provided with the item.

In one embodiment, a seller can suggest an amount he/she thinks is fair for the current transaction (2306). The buyer is free to disregard this amount and pay whatever he/she wants, but the buyer may sometimes find it to be a useful guideline. In one optional feature of this embodiment, the seller can select a different suggested amount for different potential buyers for a given item. In another optional feature of this embodiment, the ratio of the buyer's actual payment to the seller's suggested payment is calculated for one or both of them and revealed to some or all other participants. This could be useful information for buyers who want to know whether a seller's suggested amount is genuine or exaggerated, and would enable sellers to know whether a given buyer tends to pays close to what other sellers think they should. In one embodiment, the buyer and seller can discuss what they feel to be an appropriate payment, before and/or after the transaction occurs.

In one embodiment, the seller may list items that he/she doesn't necessarily currently have; the offer is not binding, and in some cases will just be a description of what he/she might be able to provide. This can be done in order to enable buyers to indicate an interest in the item. In one embodiment, a seller can provide descriptive information about an item or type of item and wait for a response from a buyer (for an indication of interest, estimation of what range of prices they might be willing to pay, etc.) before actually providing the item. In such embodiments, a buyer can view such information through Buyer Searches For Sellers form 1600.

Referring to FIG. 24, there is described one embodiment of Seller Views Items page 2400, which enables a seller to view all the items which that seller has provided to buyers by filling out Seller Provides Item form 2300. For each such item, the page displays: the actual item if the item is information (2402) or a description of the item (2404); the buyer (2406); the date/time at which the seller provided the item (2408); the payment amount if it has been set by the buyer (2410); and date/time at which the payment amount was set, if the buyer has set it (2412). This page also displays a buyer's request for additional information about an item (2414), if the buyer has made such a request in 1814 on Buyer Views Items page 1800. If the seller replies to the request by entering it in 2416, that information will appear in 1816 on Buyer Views Items page 1800. The data entered on this page is written to, and the data displayed on this page is taken from, Items database 500. If the seller decides to send a note to the buyer, information about the buyer, including his/her contact information, is read from Buyers database 700. In one embodiment, the page includes for each communication between buyer and seller any relevant reference IDs (possibly linked) to earlier communications, for that item and/or for all previous interactions between that buyer and that seller.

For items which require physical delivery, buyers and sellers could use 1814 and 1816 in FIG. 18 and 2414 and 2416 in FIG. 24 to work out the details of the delivery, or Seller Views Items page 2400 could have an additional area where the seller is able to see the buyer's postal address or other details about how the physical delivery should occur.

In one embodiment, buyers and sellers have the ability to optionally transact through traditional protocols, such as auction, negotiation, buyer sets price before transaction, and seller sets price before transaction. In such an embodiment, buyers and sellers could use 1814 and 1816 in FIG. 18 and 2414 and 2416 in FIG. 24 to work out the details of such an arrangement, or Buyer Views Items page 1800 and Seller Views Items page 2400 could have an additional area where buyers and sellers could work out the details of such an arrangement.

Referring to FIG. 25, there is described one embodiment of Seller Account Information page 2500, which enables a seller to check his/her account information, including Name, current Date/Time, and Current Account Balance. The page also displays various account metrics, such as the seller's number of items sold, average payment, average payment for each buyer the seller sold at least one item to, and outstanding payments (i.e. payments made by buyers to the system operator but not yet received by the seller from the system operator). The page also displays a list of payments the seller received and the dates on which those payments were received. The data displayed on this page are taken from System Payments To Sellers database 900 and Items database 500 and can be retrieved from the databases with standard SQL queries.

Payments are made by the system operator to sellers. There will usually be a one-to-many correspondence between the system operator's payments to a seller and the seller's assigned payments from various buyers for various items; in other words, a seller will receive one large payment from the system for a lot of items provided. In a preferred embodiment, payments by the system operator to sellers can be made by check and/or credit card. In another embodiment, a micropayment system is an option for the seller.

In a preferred embodiment, the system operator pays each seller within a certain period of time after a certain balance has been reached. In a preferred embodiment, the system operator receives a flat percentage of each transaction. In another embodiment, the amount the system operator takes isn't a flat percentage but is on a sliding scale (perhaps a smaller percentage on bigger transactions or more transactions), or is based on some set of calculations (including number of payments, average payment, and some other things). In one embodiment, certain participants might receive bonuses. In another embodiment, there might be multiple tiers to the payment amounts. In another embodiment, for some or all transactions the system operator acts as a dealer rather than a broker, and buys the item from the seller and is then able to sell it to a buyer.

In a preferred embodiment, the system operator does not pay a seller for an item until the buyer of the item has paid the system operator, and therefore the system operator assumes no risk of default. In another embodiment, the system operator sometimes does pay a seller for an item before the buyer has paid the system operator.

In one embodiment, Seller Account Information page 2500 shows the seller his/her average payment and the average payment for the whole network. In another embodiment, this page also shows the seller his/her average payment from each buyer he/she transacted with and the overall average payments for those buyers. In another embodiment, this page also shows the seller his/her average payment for each item type for those items he/she provided and the overall average payments for those item types.

In a preferred embodiment, this page enables the seller to easily view all of the items he/she has provided, or any subset of them, at once. For example, the seller could view all the items that he/she has provided and that the buyers have paid for, all the items that he/she has provided and that the buyers have assigned a payment amount for but not yet paid for, or all the items that he/she has provided and that the buyers haven't yet assigned a payment for.

Figure 26:
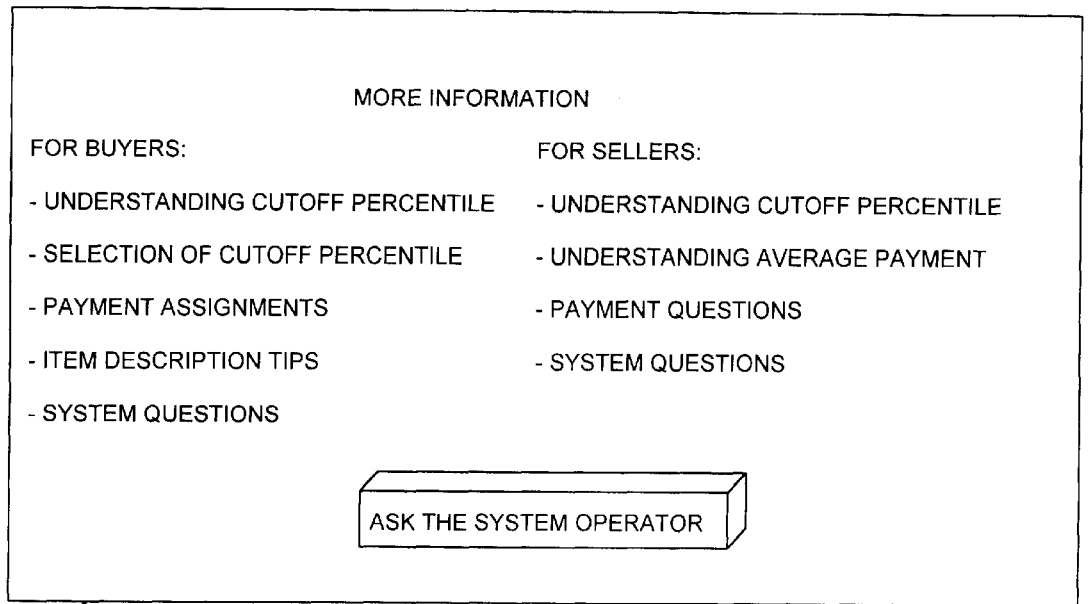
FIG. 26 illustrates one embodiment of the More Information page, which helps buyers and sellers understand how the system works and how to get the most value out of their participation in the system.

Referring to FIG. 26, there is described one embodiment of the More Information page 2600, which provides buyers and sellers with information about how the system can be used most effectively. In one exemplary embodiment, the buyer's tips include understanding cutoff percentile, proper selection of cutoff percentile, assigning payments, frequently asked system questions, and item description tips; and the seller's tips include understanding cutoff percentile, understanding average payments, frequently asked questions, payment questions, and system questions. In one embodiment, buyers and sellers can ask the system operator questions from this page.

Figure 27:
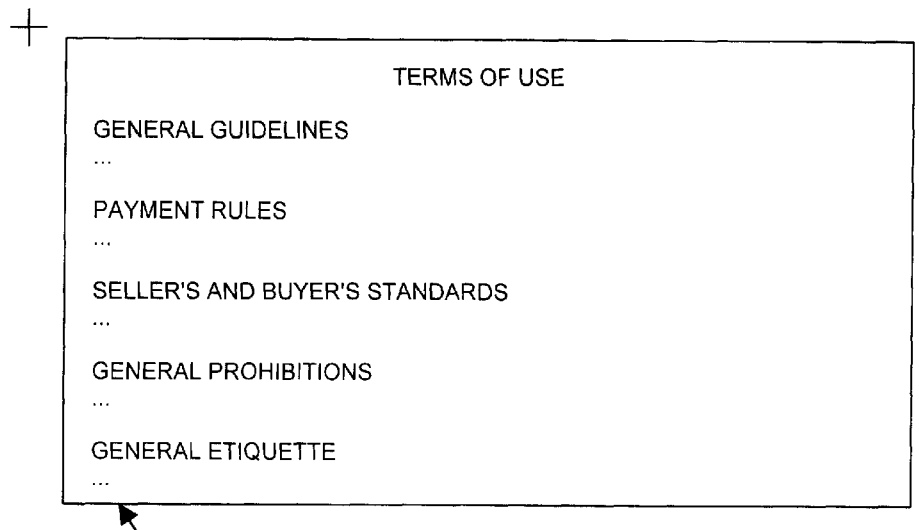
FIG. 27 illustrates one embodiment of the Terms Of Use page, which describes the terms which participants agree to be bound by when using the system.

Referring to FIG. 27, there is described one embodiment of the Terms of Use page 2700, which explains general guidelines, payment rules, seller's and buyer's standards, general prohibitions, general etiquette, and similar information. In a preferred embodiment, the terms of use reiterates that by registering and using the system, sellers and buyers understand that transactions they enter into form legally binding contracts. The terms of use might also stipulate that if a participant is kicked out of the system for violating the rules, he/she agrees to not try to re-register without the express permission of the system operator.

Referring to FIG. 28, there is described Top Listings page 2800, which exists in some embodiments. This displays various rankings of participants, such as: top participants, based on some quantitative calculation (2802); buyers who have bought the largest number of items in the last X days, where X is some predefined number, and overall (2804); sellers who have sold the largest number of items in the last X days, and overall (2806); buyers who have the highest average payment (i.e. total payments divided by number of items) in the last X days, and overall (2808); sellers who have the highest average payment in the last X days, and overall (2810); buyers who have the highest total payments in the last X days, or overall (2812), and sellers who have the highest total payments in the last X days, and overall (2814). The data displayed on this page is taken from Items database 500, Sellers database 600, and Buyers database 700, and can be taken from the databases using standard SQL queries. FIG. 28 is an exemplary illustration, and in some embodiments includes other listings such as items which received the highest payments, item types which received the highest average payments, and newest buyers and sellers to join the system. In one embodiment, the display differs depending on whether the participant was a buyer or a seller. This information could be collected automatically from the database, or could be collected manually by the system operator. This would help educate participants about what types of information receive high payments. In one optional feature of this embodiment, buyers and/or sellers could specify that they don't want their transaction information reveal others in this manner. In one embodiment, the items receiving the highest payments in the last X days, and overall, are displayed. In one embodiment, a participant can view the top listings out of those which meet criteria specified by the participant (for example, top listings by lawyers, or top listings by participants in Virginia).

Referring to FIG. 29, there is described Participant Directory 2900, which exists in some embodiments. The data displayed on this page is taken from Sellers database 600 and Buyers database 700, and can be taken from the databases using standard SQL queries. Different embodiments include different information in this directory; FIG. 29 is an exemplary embodiment. In some embodiments, the directory includes a hierarchical classification system, which is included on the buyer's and seller's registration forms and stored in the database to be queried here. In some embodiments a participant can choose not to be listed here, while in other embodiments the listing is required.

Referring to FIG. 30, there is described one embodiment of the calculation technique used to determine which transactions count toward a buyer's and seller's average payment (which appears as data within the system for other participants to view). In a preferred embodiment, D1 (the number of days a buyer has after receipt of an item in which to set a payment amount) and D2 (the number of days a buyer has after setting a payment amount in which to make a payment to cover the item) are determined by the system operator. In FIG. 30, current date is today's date, item date is the date on which the item was provided, and payment date is the date on which the buyer sets the payment amount for the item. In the first row (3002), more than D1 days have not yet passed since the item was provided to the buyer, so if the buyer hasn't set a payment amount yet, this transaction doesn't count toward the buyer's and seller's average payments (3010) but if the buyer has set a payment amount, this transaction does count toward the buyer's and seller's average payments (either 3018 or 3026). In the second row (3004), more than D1 days have passed since the item was provided to the buyer, so if the buyer hasn't set a payment amount yet, the payment is late and the transaction counts as a payment of zero toward the buyer's and seller's average payments (3012). However, if the buyer later sets a payment amount, that payment amount (and not zero) will be used toward the buyer's and seller's average payments, although the lateness of the setting of the payment amount will still be reflected in the timeliness of payments calculation, for those embodiments that include that feature. If the buyer has set a payment amount, that amount is used in calculating the buyer's and seller's average payments (either 3020 or 3028). In the third row (3006), unlike the second row, more than D2 days have passed since the buyer set the payment amount, so if the buyer hasn't yet made a payment to the system operator to cover this item, then the payment is late and the transaction counts as a payment of zero toward the buyer's and seller's average payments (either 3014 or 3022); if the buyer has made a payment to the system operator to cover this item, that amount is used in calculating the buyer's and seller's average payments (3030). However, if the buyer later makes the appropriate payment, that payment amount (and not zero) will be used toward the buyer's and seller's average payments, although the lateness of the payment will still be reflected in the timeliness of payments calculation, for those embodiments that include that feature. Note that FIG. 30 illustrates an exemplary technique for the calculation of average payments; different calculations can be used in various embodiments.

In one embodiment, any payment above a predetermined amount is treated as that predetermined amount, until the buyer has made the payment for it, for the purposes of average payment calculations. This is done in order to avoid having buyers raise their numbers artificially high by assigning a very high payment (ex. $1000) that they have no intention of paying. While such behavior would hurt them in the long run in the form of their timeliness of payments calculation, they might temporarily benefit unfairly by having a spectacular average payment number, attracting more sellers. This mechanism could deter such behavior. In another embodiment, the system operator monitors payment amounts, such as with the use of alerts, to immediately detect such behavior. In another embodiment, the system reveals what percentage of a buyer's assigned payments have been made. In another embodiment, average payment is calculated from completed payments rather than both completed and assigned payments.

In one embodiment, in addition to relevant data about a given participant, some relevant data is also made available regarding specific classes of items for that participant (e.g. not just a participant's average payment, but their average payments for each class of item they've had transactions for).

In one embodiment, a buyer can specify that it will take more than the normally allowed number of days to set a payment amount and/or make the payment. For example, the buyer might want the item but not immediately be able to use and determine the value of the item. In this case, the seller can accept or reject the delayed payment request, and if the seller accepts the request, then it isn't counted as late even if it takes longer than normally allowed.

Figure 31:
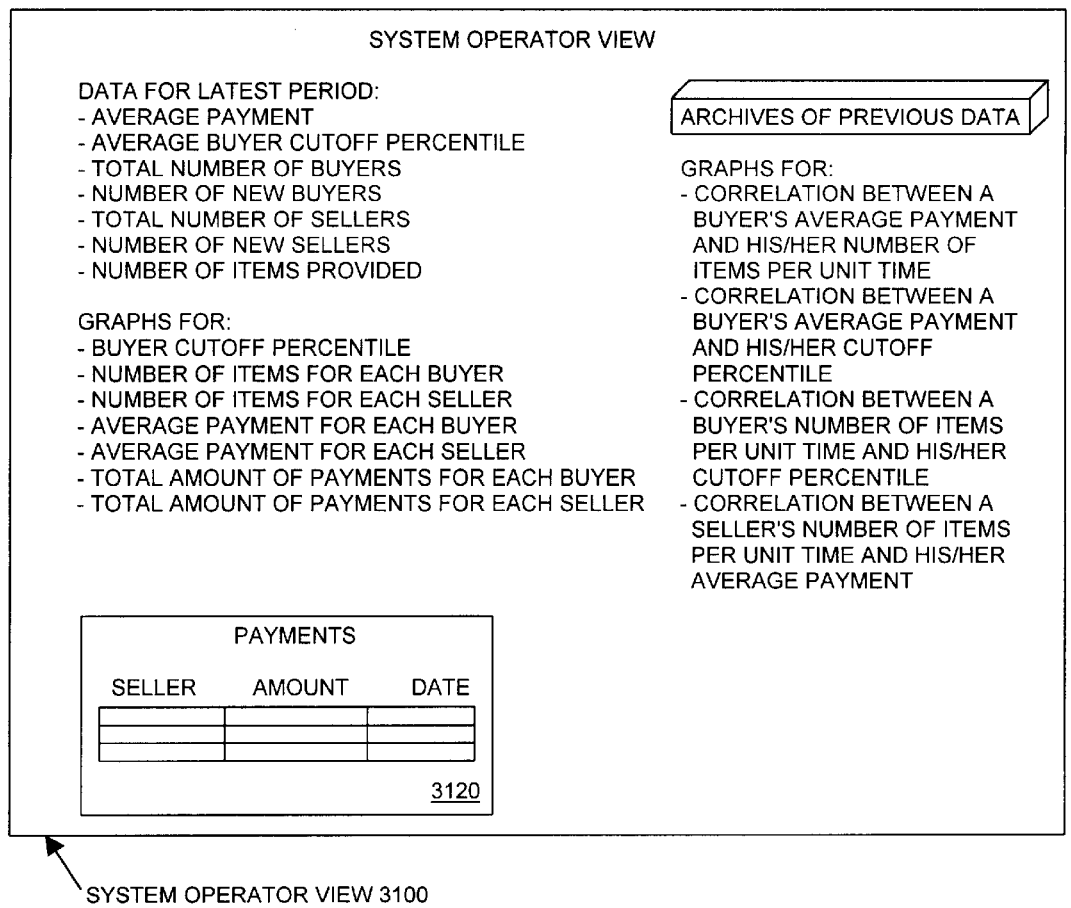
FIG. 31 illustrates one embodiment of the System Operator View page, which provides the system operator a view of information about the state of the system.

Referring to FIG. 31, there is described one embodiment of System Operator View 3100, which can be used by the system operator to get a high-level view of how the system is functioning, with details about transaction activity and buyer and seller behavior, to enable him/her to better manage the system. In an exemplary embodiment, information that can be viewed includes: average payment in a given period, average cutoff percentile, total number of buyers and sellers, number of new buyers and sellers in a given period, and number of new items provided in a given period; graphs of the distribution of buyer-specified cutoff percentiles, the distribution of number of items for each buyer, the distribution of number of items for each seller, the distribution of the average payment for each buyer, the distribution of the average payment for each seller, the distribution of the total payment amounts for each buyer, and the distribution of the total payment amounts for each seller; graphs of the correlation between a buyer's average payment and his/her number of items bought per unit time, the correlation between a buyer's average payment amount and his/her cutoff percentile, the correlation between a buyer's number of items bought per unit time and his/her cutoff percentile, and the correlation between a seller's number of items sold per unit time and his/her average payment. In a preferred embodiment, the system operator can monitor the transactions for rule violators and troublemakers, by using search tools and looking for unusual transaction behavior. The data displayed on this view are taken from Items database 500, Sellers database 600, and Buyers database 700, and can be retrieved from the databases with standard SQL queries.

Payments 3120 enables the system operator to view when and how much to pay sellers based on their system activity, and enables the system operator to make such payments.

There are many methods by which the system operator could derive a revenue stream. In one embodiment, a flat fee is charged for each item a seller provides, and/or for each item a buyer requests. In one embodiment, the seller is entitled to a proportional share of the amount paid by buyers for items the seller provided; the system operator keeps a share of the amount. In other embodiments, the share that the system operator collects is a flat fee per transaction or per month or based on a sliding scale or some other metric. In another embodiment, the buyer decides the payment amount that the system operator receives, and the system operator provides incentives for buyers to give fair payment amounts to the system operator. In one embodiment, buyers and/or sellers could pay subscription fees allowing them to use the system for a given period of time. In one embodiment, the system operator might charge for listings, and/or for certain kinds of listings, and/or for preferred placement within the system. Alternatively, the method and apparatus of the present invention may be employed without a pay-the-system-operator feature. In one embodiment, the system operator might sell demographic data to marketers and/or advertisers. In another embodiment, the system operator might sell advertising space on the system.

In a preferred embodiment, the system operator pays each seller within a certain period of time after the seller has accumulated a certain balance of payments earned from various buyers for various items provided.

In some embodiments which allow payment by check, payments are considered made as soon as the check is sent.

In other embodiments, the check must be received by the seller, or must clear, before the payment is considered made.

In one embodiment, the system also enables participants to select a traditional payment method instead of the method described in this invention. In other words, the network of buyers and sellers are able to effectuate transactions with the payment method described here, or with a traditional method such as an auction or negotiation. For example, a buyer might want a survey to be completed, and the buyer could say they'll pay a fixed amount for sellers' completed surveys, or they could do it in the normal set-payment-amount-for-each-afterwards method. In one optional feature of this embodiment, the method of this invention is a requirement for certain types of transactions; in another, it is completely optional.

In a preferred embodiment, the present invention can function as a standalone system, and it can also be integrated into other systems. For example, systems which currently employ other pricing mechanisms such as retail or auctions could offer the method of the present invention as a pricing option for their users. In some such embodiments, a plurality of such systems might be linked together to aggregate some data and to enable participants in different systems to engage in transactions with each other; in other such embodiments, they might not be linked together in this fashion.

In one embodiment, the pricing method described in this invention is used only on one side of the transaction, and a traditional pricing method is used on the other side of the transaction. For example, perhaps some or all sellers are paid by the system operator an hourly fee or a performance-based fee, while some or all buyers are compensated based on the method described in this invention. In another embodiment, some or all buyers pay the system a fee per month or per message, while some or all sellers are compensated based on the method described in this invention.

Various methods of payment may be utilized by the invention, including credit cards, personal checks, electronic funds transfer, debit cards, digital cash, and escrow accounts. Another embodiment of the present invention does not require a transfer of money from a buyer to a seller; instead, the system may be used to consummate a transaction in which the buyer provides an item or other non-monetary consideration as payment.

In a preferred embodiment, the system operator is able monitor and alter certain key metrics in order to optimize the overall value of the system. One example of such a metric is how many items buyers with a given average payment and a given cutoff percentile receive in a given period of time. It's important that a buyer which has a higher average payment gets more transactions than another one with the same cutoff percentile, to encourage buyers to pay, and this could be regulated by the system operator by making various changes to the system.

Additional Embodiments

In one embodiment, there can be a plurality of participants on the buyer side or the seller side or both (either to act collectively in a single transaction, or in a plurality of transactions). The system would enable participants to publish and search for information about such multiple-buyer and multiple-seller situations, and would enable communications between such parties to coordinate their activities. In the case of a single transaction, the payment could be split as follows: each buyer decides what he/she wants to pay (if just one seller), or the one buyer decides how much each seller gets (if just one buyer); or in the case of multiple buyers and sellers, each buyer decides how much to give to each seller. In the case of a plurality of transactions, each could be handled exactly as in the preferred embodiment. In one optional feature of the plurality-of-transactions embodiment, sellers would be able to see information that other sellers provided to a given buyer, so that the sellers might be able to collectively help the buyer better than if the sellers were acting independently. In another embodiment, they would not be able to see such information, or they might only be able to see such information in some cases.

In one embodiment, participants can sometimes earn barterable credits usable within the system instead of cash. For example, a participant could act as a seller for one item and then use the credits earned from that item to act as a buyer for another item. In one embodiment, participants might be rewarded by the system for certain activities such as participation or exceptional participation (e.g. best participants) or finding new participants to join the system. The reward might be cash or barterable credits that can be used within the system to obtain items from other sellers.

In one embodiment, the system operator can act as a trusted third party in a transaction to establish a fair payment amount. This would work well for high-value items (e.g. ones with value of, say, $100 or more), since sellers might sometimes be reluctant to provide such high value without assurance of a reasonable payment. In one optional feature of this embodiment, the seller could provide the system operator with the item, the system operator could set a price or work with the buyer to set a price for the item.

In one embodiment, the buyer and/or the seller can give a feedback rating and/or provide comments about the other participant in the transaction that some or all other participants can later read and/or use as search criteria.

In one embodiment, the buyer can specify payment terms other than price, such as how or when delivery of the item is to occur. In another embodiment, the buyer does not have this capability.

In one embodiment, the buyer can specify and make multiple payments for a single item. For example, if the buyer expects to be making use of a item repeatedly over a long period of time, he/she may choose to make periodic payments throughout the useful life of the item. In such cases the requirement that the buyer pay within a certain period of time would be waived or modified.

In one embodiment, there could be multiple tiers of buyers and/or sellers. For example, there could be Standard and Silver and Gold levels, each having its own set of requirements, options, level of access to information, and privileges.

In a preferred embodiment, iterated transactions among the same buyer and seller are possible, such as ongoing site testing or consulting projects. In some embodiments, such iterated transactions are handled differently from other transactions.

In a preferred embodiment, some aggregate data (such as average payment amounts) are calculated dynamically, while some other aggregate data are calculated periodically (i.e. cached). The different calculation techniques might require different database schemas, which one skilled in the art would have no difficulty creating.

SPECIFIC EXAMPLES

While there are countless potential uses for the present invention, the author feels that it's worth describing three significant ones.

1. Web Site Testing and Feedback

As with software, web sites often have errors (called bugs) and potential enhancements. Often it is a site's visitor who discovers the bug or thinks of an enhancement. But currently that visitor has virtually no incentive to report the information to the site. The current invention could be used in a site testing and feedback network, in which site users and testers act as sellers of bug information and feedback to the sites, who act as buyers and optionally pay the sellers for the information and feedback provided. The goal would be to enable sites to receive all the high-quality feedback they need at a discount to its value to them, and to enable individuals to make money by providing such feedback, and to enable the system operator to take a share of the value unlocked, by establishing a vast network of sites and testers which allows them to efficiently accomplish their respective goals.

In a preferred embodiment of this example, the buyers are the sites and the sellers are the users and testers. In one embodiment, a site can provide a description of how the site is supposed to work, what features to test for, and anything else that might help testers and users to provide the site with the type of feedback the site is looking for. In one optional feature of this embodiment, participating sites can include a link directly on their site to a web browser window enabling the user or tester to quickly and easily report the information or feedback. This would have the additional benefit of marketing the system to new users who discover it while visiting a participating site. In one embodiment, the system includes a directory of organized, annotated links to participating sites, to make it easier for potential testers to visit participating sites. In one embodiment, users can provide information and feedback even to sites which aren't yet participating (via those sites' normal contact channels such as a web site form or an email address), letting the site know that they could get more such information and feedback if they joined the system.

This particular embodiment would work well because:
   the value of the information is much higher to the site (buyer) than the tester (seller), so the transaction creates value which the buyer and seller can both benefit from.
   testing and feedback are becoming more necessary, as sites add more and more features and employ more complex and varied technologies.

the number of web sites is in the millions, and the number of web users is in the hundreds of millions.

2. Surveys

Companies often need to conduct surveys of specific types of people, and it is currently quite expensive to do so because it is difficult to find people meeting the required criteria. The current invention could be used to enable companies to quickly find a group of qualified people to survey, and could make it easy for those people to fill out and submit the survey data. In this embodiment, companies would be able to specify which types of people qualify for the survey, from among the profile information (demographics, areas of expertise, etc.) which sellers supply upon joining. The system would enable companies to easily design custom surveys, and would simplify the aggregation and presentation of the survey data. In one embodiment, companies could provide an idea of how much they're willing to pay for completed surveys (e.g. a range, or a specific amount for sufficiently good ones and nothing for the rest, etc.) In this embodiment, the buyers would be the companies conducting the surveys and the sellers would be the individuals who filled out the surveys. As with the Web Site Testing and Feedback example, this example works well because the value of the information is much higher to the corporation (buyer) than the surveyed person (seller), so the transaction creates value which the buyer and seller can both benefit from.

3. Stock Recommendations

There are currently a variety of resources for stock recommendations: analysts, columnists, mutual fund managers, newsletter writers, and web sites, to name a few. But it's often difficult to determine which recommendations are valuable and which are worthless. The present invention would enable sellers to offer stock recommendations to buyers, and then for those buyers to optionally act on those recommendations and pay for them only if they found them to be of value. Since the system stores information about previous transactions, buyers would be able to see which sellers have stock recommendations that other buyers have found to be of value. Through the use of the cutoff percentile feature, sellers who provided worthless recommendations would quickly find themselves at the bottom of the average payment list and would be unable to find buyers for their subsequent recommendations.

Conclusion, Ramifications, and Scope

Thus the reader will see that the present invention provides a new and unobvious method and apparatus for enabling some transactions to occur more efficiently and enabling other transactions to occur which might not otherwise occur at all. The invention enables buyers and sellers to engage in transactions in such a way that a buyer does not guarantee any specific payment for a given item, and in fact makes such a payment, if at all, after receiving the item from the seller. As described herein, the present invention also enables participants to view information about previous transactions, so that they may choose which subsets of the other participants they would like to enter into transactions with.

While my above description contains many specifications, these should not be construed as limitations on the scope of the invention, but rather as an exemplification of some preferred and other embodiments thereof. Those skilled in the art will recognize that the method and apparatus of the present invention has many applications, and that the present invention is not limited to the representative examples disclosed herein. For example, many different embodiments and optional features of those embodiments are mentioned throughout this document, but these are by no means the only possible embodiments. Also, some of the features of different embodiments listed here could be combined in many ways. Moreover, the scope of the present invention covers conventionally known variations and modifications to the system components described herein, as would be known by those skilled in the art. Thus the scope of the invention should be determined by the appended claims and their legal equivalents, rather than by the examples given.

I claim:

1. A method for using a plurality of computing devices to facilitate a transaction between at least one of buyers and at least one of sellers, comprising the steps of:
    a. enabling a seller to provide information, goods, and/or services to a buyer by inputting into at least one of said computing devices said information, goods, and/or services, and/or a description thereof,
    b. enabling said buyer to receive said information, goods, and/or services, from said seller,
    c. enabling said buyer to choose how much, if anything, to pay for said information, goods, and/or services,
    d. providing at least some of said buyers and said sellers at least partial ability to specify which other members of the set of said buyers and said sellers can engage in transactions with said specifying buyers whereby said buyers are able to receive information, goods, and services from said sellers and are able to pay whatever they choose to for said information, goods, arid services after having received said information, goods, and services, and whereby said buyers and said sellers are encouraged to behave fairly.

2. The method of claim 1 further comprising:
    enabling said specifying buyer or seller to make said specification based on the amounts of the payments buyers made in transactions in which said other members participated,
    whereby said buyers are encouraged to pay a fair amount for information, goods, and services provided to said buyers, and said sellers are encouraged to provide high-value information, goods, and services to interested buyers.

3. The method of claim 1 further comprising:
    enabling said buyers and said sellers to transact through traditional protocols.

4. The method of claim 3 wherein said traditional protocols include at least one of auction, negotiation, buyer sets price before transaction, and seller sets price before transaction.

5. An apparatus for using a plurality of computing devices to facilitate a transaction between at least one of buyers and at least one of sellers, comprising:
    a storage device; and
    a processor connected to said storage device, said storage device storing one or a plurality of programs for controlling the processor; and
    the processor operative with the programs to
        receive data from a seller regarding information, goods, and/or services provided to a buyer provide said data to said buyer
        receive data from said buyer regarding how much said buyer will pay for said information, goods, and/or services, a means for providing at least some members of the set of said buyers and said sellers at least partial ability to specify which other members of the set of said buyers and said sellers can engage in transactions with said specifying buyer or seller, whereby said buyers are able to receive information, goods, and services from said sellers and are able to pay whatever they choose to for said information, goods, and services after having received said information, goods, and services, and whereby said buyers and said sellers are encouraged to behave fairly.

6. The apparatis of claim 5 wherein at least one of the criteria by which said specifying buyer or seller can make said specification is based on the amounts of the payments made by buyers in transactions in which said other members participated, whereby said buyers are encouraged to pay a fair amount for information, goods, and services provided to said buyers, and said sellers are encouraged to provide high-value information, goods, and services to interested buyers.

7. A computer-readable medium having at least one program and said at least one program comprising the following steps:

a. enabling a seller to provide information, goods, and/or services to a buyer by inputting into at least one computing device said information, goods, and/or services, and/or a description thereof, b. enabling said buyer to receive said information, goods, and/or services, from said seller, c. enabling said buyer to choose how much, if anything, to pay for said information, goods, and/or services, d. providing at least some of said buyers and said sellers at least partial ability to specify which other members of the set of said buyers and said sellers can engage in transactions with said specifying buyer or seller whereby said buyers are able to receive information, goods, and services from said sellers and are able to pay whatever they choose to for said information, goods, and services after having received said information, goods, and services, and whereby said buyers and said sellers are encouraged to behave fairly.

8. The medium of claim 7 further comprising:

enabling said buyers and said sellers to transact through traditional protocols.

9. The medium of claim 8 wherein said traditional protocols include at least one of auction, negotiation, buyer sets price before transaction, and seller sets price before transaction.

* * * * *